US011432289B2

(12) United States Patent
Chendamarai Kannan et al.

(10) Patent No.: US 11,432,289 B2
(45) Date of Patent: Aug. 30, 2022

(54) BEAM UPDATING FOR MULTIPLE TRANSMISSION RECEPTION POINTS

(71) Applicant: QUALCOMM Incorporated, San Diego, CA (US)

(72) Inventors: Arumugam Chendamarai Kannan, San Diego, CA (US); Xiaoxia Zhang, San Diego, CA (US); Mostafa Khoshnevisan, San Diego, CA (US); Tao Luo, San Diego, CA (US); Jing Sun, San Diego, CA (US); Sungwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 16/939,867

(22) Filed: Jul. 27, 2020

(65) Prior Publication Data

US 2021/0037512 A1    Feb. 4, 2021

Related U.S. Application Data

(60) Provisional application No. 62/880,297, filed on Jul. 30, 2019.

(51) Int. Cl.
*H04W 72/04* (2009.01)
*H04L 1/18* (2006.01)

(52) U.S. Cl.
CPC ......... *H04W 72/046* (2013.01); *H04L 1/1812* (2013.01); *H04W 72/0406* (2013.01)

(58) Field of Classification Search
CPC ... H04W 28/04; H04W 72/04; H04W 72/042; H04W 88/08; H04W 72/046; H04W 72/0406; H04L 5/007; H04L 1/1812

(Continued)

(56) References Cited

U.S. PATENT DOCUMENTS

| 2018/0020382 A1* | 1/2018 | Kim | H04W 8/22 |
| 2018/0270799 A1* | 9/2018 | Noh | H04L 1/1812 |

(Continued)

FOREIGN PATENT DOCUMENTS

| WO | WO 2019/140256 A1 * | 7/2019 | ............ H04W 72/04 |
| WO | WO-2019140256 A1 | 7/2019 | |

OTHER PUBLICATIONS

3GPP TSG RAN WG1 Meeting 91, Reno, USA, Nov. 27-Dec. 1, 2017, R1-1720290, Agenda item: 7.2.2.3, Source: Samsung, Title: On Beam Management, Measurement and Reporting. (Year: 2017).*

(Continued)

*Primary Examiner* — Peter G Solinsky
*Assistant Examiner* — Sanjay K Dewan
(74) *Attorney, Agent, or Firm* — Danai Nelisile Mhembere; Holland & Hart LLP

(57) ABSTRACT

Methods, systems, and devices for wireless communications are described. Aspects include configuring a user equipment (UE) to receive control signals from a first transmission reception point (TRP) and a second TRP. A first TRP may transmit a control signal to the UE indicating resources for receiving a medium access control element (MAC-CE), where the control signal includes an indication that associates the MAC-CE with the first TRP. The first TRP may transmit the MAC-CE to the UE which may include a beam update indication for the first TRP. The UE may transmit an acknowledgement to the first TRP based on receiving the MAC-CE. The UE may also transmit an acknowledgment to the second TRP indicating that it has received a beam update indication from the first TRP. In some cases, the first TRP may send a MAC-CE signal to the UE including beam update information for the second TRP.

30 Claims, 18 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0053183 | A1* | 2/2019 | Park | H04B 7/0617 |
| 2019/0141695 | A1* | 5/2019 | Babaei | H04L 5/0048 |
| 2019/0207667 | A1* | 7/2019 | Zhou | H04W 72/042 |
| 2019/0207731 | A1* | 7/2019 | Park | H04B 7/0478 |
| 2019/0363843 | A1* | 11/2019 | Gordaychik | H04L 1/1854 |
| 2020/0015200 | A1* | 1/2020 | Vilaipornsawai | H04L 25/0204 |
| 2020/0313729 | A1* | 10/2020 | Zhou | H04W 72/046 |

OTHER PUBLICATIONS

International Search Report and Written Opinion—PCT/US2020/043877—ISA/EPO—dated Nov. 4, 2020 (193502WO).

Qualcomm Incorporated: "Remaining Details on QCL", 3GPP TSG RAN WG1 Meeting #91, 3GPP Draft, 3GPP TSG RAN WG1 Meeting #91, R1-1720672, 3rd Generation Partnership Project (3GPP), Mobile Competence Centre, 650, Route Des Lucioles, F-06921 Sophia-Antipolis Cedex, France, vol. RAN WG1, No. Reno, Nevada, USA; Nov. 27, 2017-Dec. 1, 2017, Nov. 18, 2017 (Nov. 18, 2017), pp. 1-9, XP051370133, Retrieved from the Internet: URL: http://www.3gpp.org/ftp/tsg_ran/WG1_RL1/TSGR1_91/Docs/, http://www.3gpp.org/ftp/tsg_ran/WG1_RL1/TSGR1_91/Docs/ [retrieved on Nov. 18, 2017] sections 1-3, the whole document.
Samsung: "On Beam Management, Measurement and Reporting", 3GPP TSG RAN WG1 Meeting #91, 3GPP Draft; R1-1720290_V1,3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Nov. 17, 2017 (Nov. 17, 2017), XP051368939, 15 Pages, Retrieved from the Internet: URL: http://www.3gpp.org/ftp/tsg_ran/WG1_RL1/TSGR1_91/Docs/, http://www.3gpp.org/ftp/tsg_ran/WG1_RL1/TSGR1_91/Docs/[retrieved on Nov. 17, 2017], Sections 2.1, 2.4, Proposal 7, p. 1, paragraph 2.1-p. 3, paragraph2.3.

* cited by examiner

| R | Serving Cell ID | BWP ID |
|---|---|---|
| 0 | TCI State ID for first codepoint of TRP A | |
| 1 | TCI State ID for first codepoint of TRP B | |
| | | |
| 0 | TCI State ID for $n^{th}$ codepoint of TRP A | |
| 1 | TCI State ID for $n^{th}$ codepoint of TRP B | |

BEAM UPDATING FOR MULTIPLE TRANSMISSION RECEPTION POINTS

CROSS REFERENCE

The present application for patent claims the benefit of U.S. Provisional Patent Application No. 62/880,297 by CHENDAMARAI KANNAN et al., entitled "BEAM UPDATING FOR MULTIPLE TRANSMISSION RECEPTION POINTS," filed Jul. 30, 2019, assigned to the assignee hereof, and expressly incorporated by reference herein.

FIELD OF TECHNOLOGY

The following relates generally to wireless communications and more specifically to beam updating for multiple transmission reception points.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may support communications with network access nodes using one or more beams. In such systems, it may be appropriate for the UE to identify or update a beam to use for communicating with a network access node from a number of active beams (e.g., for a control or data transmission). Accordingly, when a UE is scheduled to receive a downlink transmission, for example, a network access node may transmit an indication of a transmission control indicator (TCI) state that corresponds to a transmit beam to be used by the base station for the downlink transmission, and the UE may select a receive beam to receive the downlink transmission based on the transmit beam. Conventional techniques for updating and managing TCI states may be limited to communication between a UE and a single network access node.

SUMMARY

The described techniques relate to improved methods, systems, devices, and apparatuses that support beam updating for multiple transmission reception points (TRPs). Generally, the described techniques provide for configuring a UE to receive control signals from two or more TRPs of a TRP cluster. The UE may receive a first control signal from a first TRP that schedules a first medium access control element (MAC-CE) for the first TRP. The first control signal may include an indication that associates the first MAC-CE with the first TRP. Based on receiving the first control signal, the UE may receive the first MAC-CE that includes a TCI state for the first TRP and update one or more beams for communications with the first TRP. The UE may send an acknowledgement to the first UE that the one or more beams have been updated by the first MAC-CE. In some cases, the first UE may also send an acknowledgement to other configured TRPs (e.g., a second network access node) that indicates that the TCI state for the first TRP has been updated. Accordingly, these other TRPs may use this information to trigger one or more processes, such as evaluating or updating their own TCI state with the UE. Additionally or alternatively, the UE may perform similar beam updating procedures for other TRPs by receiving indications in a MAC-CE received from a first TRP that associates TCI states with other TRPs.

A method of wireless communication at a UE is described. The method may include receiving a configuration message configuring the UE to receive control signals from a first transmission reception point and a second transmission reception point of a transmission reception point cluster and receiving a first control signal from the first transmission reception point indicating resources for receiving a medium access control element, where the first control signal includes an indication that associates the medium access control element with the first transmission reception point. The method may further include receiving the medium access control element based on receiving the first control signal, where the medium access control element includes a beam update indication for the first transmission reception point, and transmitting a first acknowledgment to at least the first transmission reception point based on receiving the medium access control element.

An apparatus for wireless communication at a UE is described. The apparatus may include a processor, memory coupled with the processor, and instructions stored in the memory. The instructions may be executable by the processor to cause the apparatus to receive a configuration message configuring the UE to receive control signals from a first transmission reception point and a second transmission reception point of a transmission reception point cluster and receive a first control signal from the first transmission reception point indicating resources for receiving a medium access control element, where the first control signal includes an indication that associates the medium access control element with the first transmission reception point. The instructions may further be executable by the processor to cause the apparatus to receive the medium access control element based on receiving the first control signal, where the medium access control element includes a beam update indication for the first transmission reception point, and transmit a first acknowledgment to at least the first transmission reception point based on receiving the medium access control element.

Another apparatus for wireless communication at a UE is described. The apparatus may include means for receiving a configuration message configuring the UE to receive control signals from a first transmission reception point and a second transmission reception point of a transmission reception point cluster and receiving a first control signal from the first transmission reception point indicating resources for receiving a medium access control element, where the first control signal includes an indication that associates the medium access control element with the first transmission reception point. The apparatus may further include means for receiving the medium access control element based on receiving the first control signal, where the medium access control element includes a beam update indication for the first transmission reception point, and transmitting a first acknowledgment to at least the first transmission reception point based on receiving the medium access control element.

A non-transitory computer-readable medium storing code for wireless communication at a UE is described. The code may include instructions executable by a processor to receive a configuration message configuring the UE to receive control signals from a first transmission reception point and a second transmission reception point of a transmission reception point cluster and receive a first control signal from the first transmission reception point indicating resources for receiving a medium access control element, where the first control signal includes an indication that associates the medium access control element with the first transmission reception point. The code may further include instructions executable by a processor to receive the medium access control element based on receiving the first control signal, where the medium access control element includes a beam update indication for the first transmission reception point, and transmit a first acknowledgment to at least the first transmission reception point based on receiving the medium access control element.

Some examples of the method, apparatuses, and non-transitory computer-readable medium described herein may further include operations, features, means, or instructions for transmitting a second acknowledgment to the second transmission reception point based on receiving the medium access control element, where the second acknowledgment indicates that the UE received the beam update indication from the first transmission reception point.

Some examples of the method, apparatuses, and non-transitory computer-readable medium described herein may further include operations, features, means, or instructions for transmitting the first acknowledgment to the first transmission reception point using a first uplink beam, and transmitting the second acknowledgment to the second transmission reception point using a second uplink beam, where the first and second uplink beams each include the same time and frequency resources based on the first control signal.

Some examples of the method, apparatuses, and non-transitory computer-readable medium described herein may further include operations, features, means, or instructions for transmitting the first acknowledgment to the first transmission reception point using first uplink resources that may be based on a resource indicator and an acknowledgment timing offset in the first control signal, and transmitting the second acknowledgment to the second transmission reception point using second uplink resources that may be based on modified parameters for the resource indicator and the acknowledgment timing offset in the first control signal.

In some examples of the method, apparatuses, and non-transitory computer-readable medium described herein, the second uplink resources may be based on configured resources for transmissions between the UE and the second transmission reception point.

In some examples of the method, apparatuses, and non-transitory computer-readable medium described herein, the acknowledgment timing offset for the second acknowledgment may be sent using a modified acknowledgment timing offset that may be greater than a first acknowledgment timing offset for the first acknowledgment.

In some examples of the method, apparatuses, and non-transitory computer-readable medium described herein, the second acknowledgment may be transmitted to the second transmission reception point using dedicated resources for communicating medium access control element confirmations.

Some examples of the method, apparatuses, and non-transitory computer-readable medium described herein may further include operations, features, means, or instructions for updating a beam configuration at the UE based on the beam update indication.

In some examples of the method, apparatuses, and non-transitory computer-readable medium described herein, the beam update indication includes a transmission control indicator state.

A method of wireless communication at a transmission reception point cluster is described. The method may include transmitting a configuration message to a UE that configures the UE to receive control signals from a first transmission reception point and a second transmission reception point of the transmission reception point cluster and transmitting a first control signal from the first transmission reception point of the transmission reception point cluster indicating resources for receiving a medium access control element, where the first control signal includes an indication that associates the medium access control element with the first transmission reception point. The method may further include transmitting the medium access control element based on transmitting the first control signal, where the medium access control element includes a beam update indication for the first transmission reception point, and receiving a first acknowledgment from the UE based on transmitting the medium access control element.

An apparatus for wireless communication at a transmission reception point cluster is described. The apparatus may include a processor, memory coupled with the processor, and instructions stored in the memory. The instructions may be executable by the processor to cause the apparatus to transmit a configuration message to a UE that configures the UE to receive control signals from a first transmission reception point and a second transmission reception point of the transmission reception point cluster and transmit a first control signal from the first transmission reception point of the transmission reception point cluster indicating resources for receiving a medium access control element, where the first control signal includes an indication that associates the medium access control element with the first transmission reception point, transmit the medium access control element based on transmitting the first control signal, where the medium access control element includes a beam update indication for the first transmission reception point, and receive a first acknowledgment from the UE based on transmitting the medium access control element.

Another apparatus for wireless communication at a transmission reception point cluster is described. The apparatus may include means for transmitting a configuration message to a UE that configures the UE to receive control signals from a first transmission reception point and a second transmission reception point of the transmission reception point cluster, transmitting a first control signal from the first transmission reception point of the transmission reception point cluster indicating resources for receiving a medium access control element, where the first control signal includes an indication that associates the medium access control element with the first transmission reception point, transmitting the medium access control element based on transmitting the first control signal, where the medium access control element includes a beam update indication for the first transmission reception point, and receiving a first acknowledgment from the UE based on transmitting the medium access control element.

A non-transitory computer-readable medium storing code for wireless communication at a transmission reception point cluster is described. The code may include instructions executable by a processor to transmit a configuration message to a UE that configures the UE to receive control signals from a first transmission reception point and a second transmission reception point of the transmission reception point cluster, transmit a first control signal from the first transmission reception point of the transmission reception point cluster indicating resources for receiving a medium access control element, where the first control signal includes an indication that associates the medium access control element with the first transmission reception point, transmit the medium access control element based on transmitting the first control signal, where the medium access control element includes a beam update indication for the first transmission reception point, and receive a first acknowledgment from the UE based on transmitting the medium access control element.

Some examples of the method, apparatuses, and non-transitory computer-readable medium described herein may further include operations, features, means, or instructions for receiving a second acknowledgment at the second transmission reception point of the transmission reception point cluster, where the second acknowledgment indicates that the UE received the beam update indication from the first transmission reception point.

Some examples of the method, apparatuses, and non-transitory computer-readable medium described herein may further include operations, features, means, or instructions for receiving the first acknowledgement at the first transmission reception point using a first uplink beam based on resources indicated by the first control signal, and receiving the second acknowledgement at the second transmission reception point using a second uplink beam based on resources indicated by the first control signal, where the first and second uplink beams each include the same time and frequency resources.

Some examples of the method, apparatuses, and non-transitory computer-readable medium described herein may further include operations, features, means, or instructions for receiving the first acknowledgment at the first transmission reception point using first uplink resources that may be based on a resource indicator and an acknowledgment timing offset in the first control signal, and receiving the second acknowledgment at the second transmission reception point using second uplink resources that may be based on modified parameters for the resource indicator and the acknowledgment timing offset in the first control signal.

In some examples of the method, apparatuses, and non-transitory computer-readable medium described herein, the second uplink resources may be based on configured resources for transmissions between the UE and the second transmission reception point.

In some examples of the method, apparatuses, and non-transitory computer-readable medium described herein, the second acknowledgment may be received by the second transmission reception point after the first acknowledgment may be received by the first transmission reception point.

In some examples of the method, apparatuses, and non-transitory computer-readable medium described herein, the second acknowledgment may be received by the second transmission reception point using dedicated resources for communicating medium access control element confirmations.

Some examples of the method, apparatuses, and non-transitory computer-readable medium described herein may further include operations, features, means, or instructions for updating a beam configuration at the first transmission reception point based on the beam update indication.

In some examples of the method, apparatuses, and non-transitory computer-readable medium described herein, the beam update indication includes a transmission control indicator state.

A method of wireless communication at a UE is described. The method may include receiving a configuration message configuring the UE to receive control signals from a first transmission reception point and a second transmission reception point of a transmission reception point cluster and receiving a first control signal from the first transmission reception point indicating resources for receiving a medium access control element. The method may further include receiving the medium access control element from the first transmission reception point, where the medium access control element includes a first beam update indication for the second transmission reception point and an indication that associates the medium access control element with the second transmission reception point, and transmitting a first acknowledgment based on receiving the medium access control element.

An apparatus for wireless communication at a UE is described. The apparatus may include a processor, memory coupled with the processor, and instructions stored in the memory. The instructions may be executable by the processor to cause the apparatus to receive a configuration message configuring the UE to receive control signals from a first transmission reception point and a second transmission reception point of a transmission reception point cluster and receive a first control signal from the first transmission reception point indicating resources for receiving a medium access control element. The instructions may further be executable by the processor to cause the apparatus to receive the medium access control element from the first transmission reception point, where the medium access control element includes a first beam update indication for the second transmission reception point and an indication that associates the medium access control element with the second transmission reception point, and transmit a first acknowledgment based on receiving the medium access control element.

Another apparatus for wireless communication at a UE is described. The apparatus may include means for receiving a configuration message configuring the UE to receive control signals from a first transmission reception point and a second transmission reception point of a transmission reception point cluster and receiving a first control signal from the first transmission reception point indicating resources for receiving a medium access control element. The apparatus may further include means for receiving the medium access control element from the first transmission reception point, where the medium access control element includes a first beam update indication for the second transmission reception point and an indication that associates the medium access control element with the second transmission reception point, and transmitting a first acknowledgment based on receiving the medium access control element.

A non-transitory computer-readable medium storing code for wireless communication at a UE is described. The code may include instructions executable by a processor to receive a configuration message configuring the UE to receive control signals from a first transmission reception point and a second transmission reception point of a transmission reception point cluster and receive a first control signal from the first transmission reception point indicating resources for receiving a medium access control element. The code may further include instructions executable by a processor to receive the medium access control element from the first transmission reception point, where the medium access control element includes a first beam update indication for the second transmission reception point and an indication that associates the medium access control element with the second transmission reception point, and transmit a first acknowledgment based on receiving the medium access control element.

In some examples of the method, apparatuses, and non-transitory computer-readable medium described herein, the medium access control element includes a first transmission reception point indicator for indicating that the first beam update indication may be associated with the second transmission reception point.

In some examples of the method, apparatuses, and non-transitory computer-readable medium described herein, the medium access control element may include operations, features, means, or instructions for a second beam update indicator for the first transmission reception point, and a second transmission reception point indicator for indicating that the second beam update indicator may be associated with the first transmission reception point.

In some examples of the method, apparatuses, and non-transitory computer-readable medium described herein, the medium access control element may include a first set of fields including a beam update indication for the second transmission reception point, a second set of fields including a beam update indication for the first transmission reception point, and a transmission reception point indicator filed for indicating whether the beam update indication for the second transmission reception point may be included in the medium access control element.

In some examples of the method, apparatuses, and non-transitory computer-readable medium described herein, the first acknowledgment confirms that a beam configuration was updated for communications with the second transmission reception point.

In some examples of the method, apparatuses, and non-transitory computer-readable medium described herein, the first acknowledgment may be transmitted by the UE to the first transmission reception point to be communicated with the second transmission reception point.

In some examples of the method, apparatuses, and non-transitory computer-readable medium described herein, the first acknowledgment may be transmitted to the first transmission reception point, the second transmission reception point or both.

Some examples of the method, apparatuses, and non-transitory computer-readable medium described herein may further include operations, features, means, or instructions for transmitting the first acknowledgment to the first transmission reception point using a first uplink beam, and transmitting a second acknowledgment to the second transmission reception point using a second uplink beam, where the first and second uplink beams each include the same time and frequency resources based on the first control signal.

Some examples of the method, apparatuses, and non-transitory computer-readable medium described herein may further include operations, features, means, or instructions for transmitting the first acknowledgment to the first transmission reception point using first uplink resources that may be based on a resource indicator and an acknowledgment timing offset in the first control signal, and transmitting a second acknowledgment to the second transmission reception point using second uplink resources that may be based on modified parameters for the resource indicator and the acknowledgment timing offset in the first control signal.

In some examples of the method, apparatuses, and non-transitory computer-readable medium described herein, the acknowledgment timing offset for the second uplink resources may be sent using a modified acknowledgment timing offset that may be greater than a first acknowledgment timing offset for the first uplink resources.

In some examples of the method, apparatuses, and non-transitory computer-readable medium described herein, the first acknowledgment may be transmitted to the second transmission reception point using dedicated resources for communicating medium access control element confirmations.

A method of wireless communication at a transmission reception point cluster is described. The method may include transmitting a configuration message to a UE that configures the UE to receive control signals from a first transmission reception point and a second transmission reception point of the transmission reception point cluster, transmitting a first control signal from the first transmission reception point indicating resources for receiving a medium access control element, transmitting the medium access control element from the first transmission reception point, where the medium access control element includes a first beam update indication for the second transmission reception point and an indication that associates the medium access control element with the second transmission reception point, and receiving a first acknowledgment at the transmission reception point cluster based on transmitting the medium access control element.

An apparatus for wireless communication at a transmission reception point cluster is described. The apparatus may include a processor, memory coupled with the processor, and instructions stored in the memory. The instructions may be executable by the processor to cause the apparatus to transmit a configuration message to a UE that configures the UE to receive control signals from a first transmission reception point and a second transmission reception point of the transmission reception point cluster, transmit a first control signal from the first transmission reception point indicating resources for receiving a medium access control element, transmit the medium access control element from the first transmission reception point, where the medium access control element includes a first beam update indication for the second transmission reception point and an indication that associates the medium access control element with the second transmission reception point, and receive a first acknowledgment at the transmission reception point cluster based on transmitting the medium access control element.

Another apparatus for wireless communication at a transmission reception point cluster is described. The apparatus may include means for transmitting a configuration message to a UE that configures the UE to receive control signals from a first transmission reception point and a second transmission reception point of the transmission reception point cluster, transmitting a first control signal from the first transmission reception point indicating resources for receiving a medium access control element, transmitting the medium access control element from the first transmission reception point, where the medium access control element includes a first beam update indication for the second transmission reception point and an indication that associates the medium access control element with the second transmission reception point, and receiving a first acknowledgment at the transmission reception point cluster based on transmitting the medium access control element.

A non-transitory computer-readable medium storing code for wireless communication at a transmission reception point cluster is described. The code may include instructions executable by a processor to transmit a configuration message to a UE that configures the UE to receive control signals from a first transmission reception point and a second transmission reception point of the transmission reception point cluster, transmit a first control signal from the first transmission reception point indicating resources for receiving a medium access control element, transmit the medium access control element from the first transmission reception point, where the medium access control element includes a first beam update indication for the second transmission reception point and an indication that associates the medium access control element with the second transmission reception point, and receive a first acknowledgment at the transmission reception point cluster based on transmitting the medium access control element.

In some examples of the method, apparatuses, and non-transitory computer-readable medium described herein, the medium access control element includes a first transmission reception point indicator for indicating that the first beam update indication may be associated with the second transmission reception point.

In some examples of the method, apparatuses, and non-transitory computer-readable medium described herein, the medium access control element may include operations, features, means, or instructions for a second beam update indicator for the first transmission reception point, and a second transmission reception point indicator for indicating that the second beam update indicator may be associated with the first transmission reception point.

In some examples of the method, apparatuses, and non-transitory computer-readable medium described herein, the medium access control element may include a first set of fields including a beam update indication for the second transmission reception point, a second set of fields including a beam update indication for the first transmission reception point, and a transmission reception point indicator filed for indicating whether the beam update indication for the second transmission reception point may be includes in the medium access control element.

In some examples of the method, apparatuses, and non-transitory computer-readable medium described herein, the first acknowledgment confirms that a beam configuration was updated for communications with the second transmission reception point.

In some examples of the method, apparatuses, and non-transitory computer-readable medium described herein, the first acknowledgment may be received at the first transmission reception point and the first transmission reception point communicates the acknowledgment with the second transmission reception point.

In some examples of the method, apparatuses, and non-transitory computer-readable medium described herein, the first acknowledgment may be received at the first transmission reception point, the second transmission reception point or both.

Some examples of the method, apparatuses, and non-transitory computer-readable medium described herein may further include operations, features, means, or instructions for receiving the first acknowledgment at the first transmission reception point using a first uplink beam, and receiving a second acknowledgment at the second transmission reception point using a second uplink beam, where the first and second uplink beams each include the same time and frequency resources based on the first control signal.

Some examples of the method, apparatuses, and non-transitory computer-readable medium described herein may further include operations, features, means, or instructions for receiving the first acknowledgment at the first transmission reception point using first uplink resources that may be based on a resource indicator and an acknowledgment timing offset in the first control signal, and receiving a second acknowledgment at the second transmission reception point using second uplink resources that may be based on modified parameters for the resource indicator and the acknowledgment timing offset in the first control signal.

In some examples of the method, apparatuses, and non-transitory computer-readable medium described herein, the acknowledgment timing offset for the second uplink resources may be sent using a modified acknowledgment timing offset that may be greater than a first acknowledgment timing offset for the first uplink resources.

In some examples of the method, apparatuses, and non-transitory computer-readable medium described herein, the first acknowledgment may be received using dedicated resources for communicating medium access control element confirmations.

DETAILED DESCRIPTION

Figure 1:
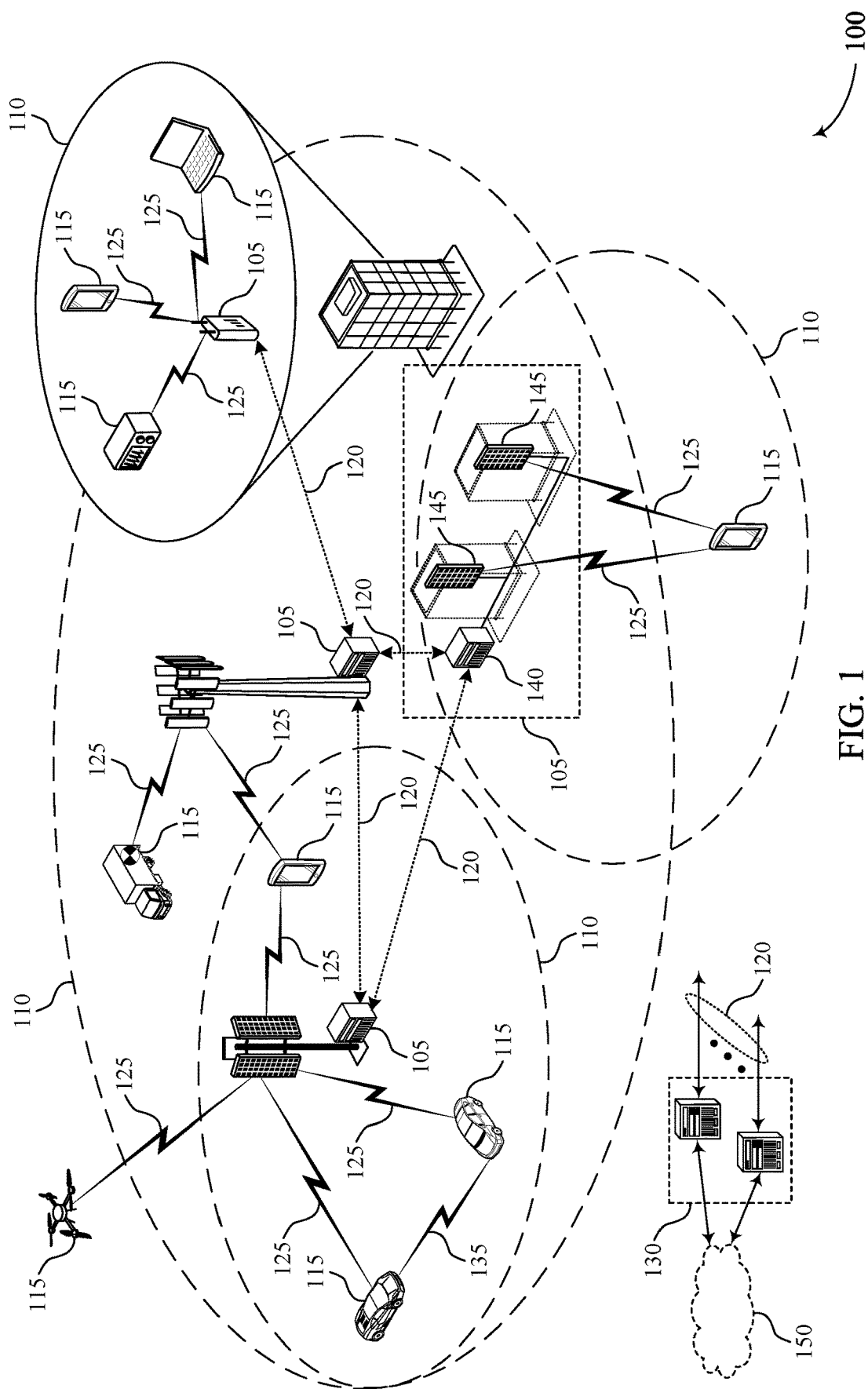
FIG. 1 illustrates an example of a system for wireless communications that supports beam updating for multiple TRPs in accordance with aspects of the present disclosure.

In some wireless communications systems, a user equipment (UE) may support communications with multiple transmission-reception points (TRPs). For example, as part of a single physical downlink control channel (PDCCH) configuration, a first TRP may communicate control information for multiple TRPs (e.g., the first TRP and a second TRP) with the UE, which may be used to configure or update transmission and receiving beams for communications between the UE and each TRP. In some cases, the control information may schedule a medium access control element (MAC-CE) that is used to configure or update transmission configuration indication (TCI) states for each TRP. The multiple TRPs may each transmit data to the UE using different beams configured based on the TCI states. Multiple TRPs may be grouped together in one or more groups or clusters. TRPs of a TRP cluster may communicate or otherwise coordinate with each other via a backhaul connection or the like.

In some cases, it may be desirable to have multiple TRPs of a TRP cluster schedule control information with the UE. For example, as part of a two PDCCH multi-TRP configuration, two TRPs may each independently transmit control information and data with a single UE. Such a system may improve the reliability of communications between TRPs of a TRP cluster and a UE since a two PDCCH multi-TRP system may configure multiple control channels between the TRP cluster and a UE.

Control signaling used for single PDCCH configurations (e.g., where only one TRP of a TRP cluster transmits control data) may not support communications between the TRPs and a UE in a multi-PDCCH system. For example, a UE receiving multiple different control transmissions (e.g., MAC-CEs) from different TRPs may need to identify which control information is associated with which TRP. However, control signaling used in a single PDCCH configuration may not explicitly associate a control transmission (e.g., MAC-CE) with a specific TRP. Accordingly, techniques used to transmit control signaling in a single PDCCH configuration may be inadequate for transmitting control signaling in a multi-PDCCH configuration (e.g., a two PDCCH multi-TRP configuration).

In a first set of examples, a TRP of a TRP cluster may transmit signaling to a UE that indicates an update to its own beams for communicating with the UE. For example, each TRP may transmit control signals (e.g., PDCCH) to a UE that includes an indication that associates a MAC-CE received at the UE with the TRP that transmitted the control signals. For example, a first TRP may transmit a first PDCCH to a UE that includes an indication that associates a MAC-CE with the first TRP. The first TRP may transmit the MAC-CE to the UE that includes an updated TCI state. Accordingly, the UE may associate the TCI state from the MAC-CE with the first TRP based on the first PDCCH signal. In some cases, the UE may send an acknowledgement to the first TRP indicating that the TCI state has been updated. In other cases, the UE may send an acknowledgement to the first TRP and other configured TRPs (e.g., a second TRP of a TRP cluster) indicating that a TCI state for the first TRP has been updated. Sending an acknowledgement indicating that a TCI state for the first TRP was updated to the other TRPs may be beneficial for a variety of reasons. For example, in cases where backhaul communications between the first TRP and other TRPs is disrupted or slow, it may be more efficient for the UE to inform other TRPs that a beam with the first TRP was changed. Other TRPs may update or evaluate their beams with the UE based on changes to the first TRP beam.

In another set of examples, a TRP of a TRP cluster may transmit signaling to a UE that indicates an update to the beams for communication between other TRPs and the UE. For example, a TRP may transmit a MAC-CE to the UE that includes TCI-states for itself, other TRPs, or both. The MAC-CE may include an indication that associates each TCI state with a specific TRP. For example, a first TRP may transmit a MAC-CE signal to the UE including a TCI state for a second TRP. The MAC-CE may also include an indication that associates the TCI state with the second TRP. In response, the UE may update the TCI state for beams with the second TRP and send an acknowledgement indicating that a TCI state for the second TRP has been updated. In some cases, the UE may send the acknowledgement to the first TRP that sent the MAC-CE. In other cases, the UE may send the acknowledgement to both the first TRP and the second TRP. In still other cases, the UE may send the acknowledgement to the second TRP without sending an acknowledgement to the first TRP. Additionally or alternatively, the TRPs may communicate with each other (e.g., via backhaul links) to communicate TCI data, acknowledgement data, control data, or any combination thereof.

Aspects of the disclosure are initially described in the context of wireless communications systems. Aspects of the disclosure are then described in the context of a wireless communication system and MAC-CE payload content that supports updating of beam data for a multiple TRP system. Aspects of the disclosure are further illustrated by and described with reference to apparatus diagrams, system diagrams, and flowcharts that relate to beam updating for multiple transmission reception points.

FIG. 1 illustrates an example of a wireless communications system 100 that supports beam updating for multiple transmission reception points in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support updating antenna beams (e.g., a transmit beam, a receive beam) for a UE 115 configured to communicate with multiple access network transmission entities 145. The access network transmission entities 145 may be examples of TRPs. In some case, each access network transmission entity 145 may transmit control information to a UE 115 that includes an indication that associates a MAC-CE with a particular access network transmission entity 145. For example, a first access network transmission entity 145 may transmit a PDCCH signal to a UE 115 including the indication associating a MAC-CE with the first access network transmission entity 145. The access network transmission entity 145 may also transmit the MAC-CE containing antenna beam information (e.g., TCI state information) to the UE 115. The TCI state may be derived from a reference signal (e.g., synchronization signal block (SSB), channel state information (CSI-RS), tracking reference signal (TRS), or the like) from a set of candidate TCI states configured at the UE. Using MAC signaling, a TRP can indicate a specific TCI state from the set of candidate beams, and the UE can determine a receive beam for receiving the PDCCH signal based on the TCI state indicated in the MAC-CE. That is, the UE may determine a receiver-side beam direction (TCI state) for reception of the reference signal and use this beam direction for reception of the PDCCH. The UE may update its TCI state for the first access network transmission entity 145 based on the indication in the PDCCH signal and send an acknowledgement to the first access network transmission entity 145 indicating that the TCI state has been updated. In some cases, the UE 115 may also send an acknowledgement to a second access network transmission entity 145 that the TCI state for the first access network transmission entity 145 has been updated. The second access network transmission entity 145 may perform one or more procedures, such as evaluating its antenna beams with the UE 115, based on receiving the acknowledgement.

In some cases, a first access network transmission entity 145 may update antenna beams for a second access network transmission entity 145. For example, the first access network transmission entity 145 may transmit a MAC-CE signal to the UE 115 that includes a TCI state for the second access network transmission entity 145. The MAC-CE may include an indication that associates the TCI state with the second access network transmission entity 145, which may be used by the UE 115 to update antenna beams used to communicate with the second access network transmission entity 145. The UE 115 may send an acknowledgement indicating that antenna beams for communications with the second access network transmission entity 145 were updated, which may be sent to the first access network transmission entity 145, the second access network transmission entity 145 or both.

Figure 2:
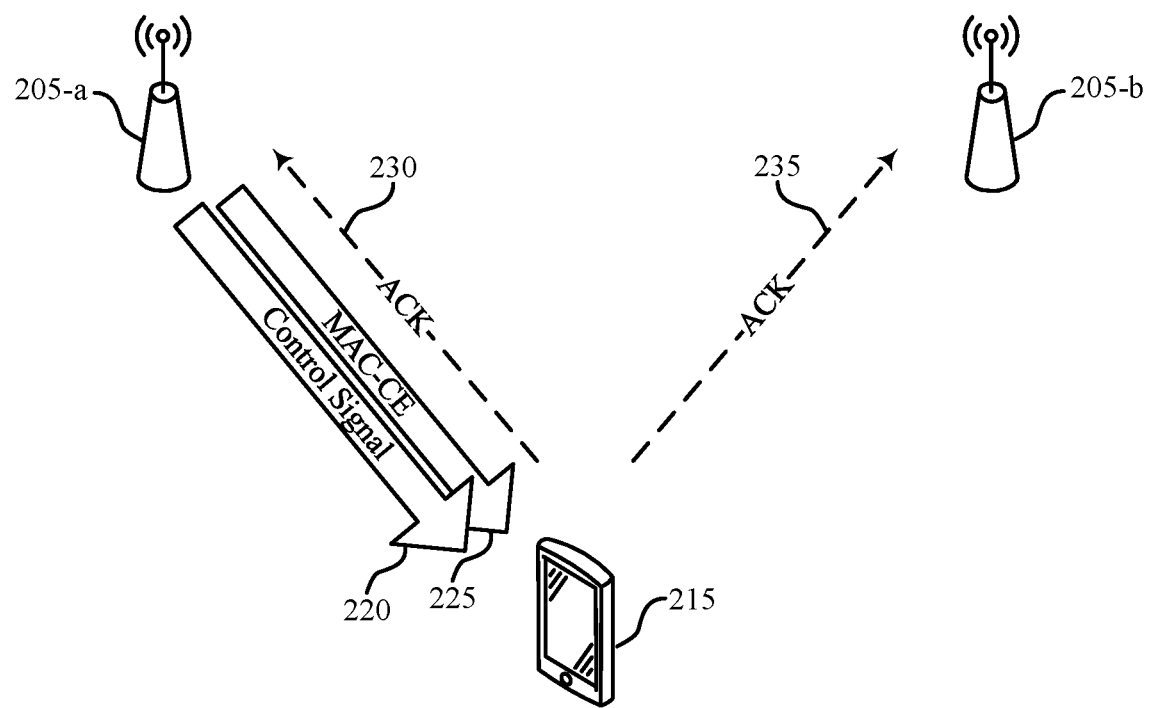
FIG. 2 illustrates an example of a wireless communications system that supports each TRP updating its beam state in a multiple TRP system in accordance with aspects of the present disclosure.

FIG. 2 illustrates an example of a wireless communications system 200 that supports each TRP updating its own beam state information in a multiple TRP system in accordance with aspects of the present disclosure. In some examples, the wireless communications system 200 may implement aspects of wireless communication system 100. The wireless communications system 200 may include multiple TRPs 205, which may be examples of base stations 105 or access network transmission entities 145 described with reference to FIG. 1, and a UE 215, which may be an example of UEs 115 described with reference to FIG. 1. The wireless communications system 200 provides examples of control signals 220, MAC-CE 225 and acknowledgement (ACK/NACK) 230 and 235 transmitted between the TRPs 205 and the UE 215 when a TRP 205 updates its own beam configuration (e.g., TCI states) for communications with the UE 215.

Each TRP 205 may schedule communications with the UE 215 independently using dedicated control signaling between the TRP 205 and UE 215. For example, the first TRP 205-*a* may schedule communications with the UE 215 by transmitting one or more PDCCHs 220 to the UE 215. Similar control signals that are not shown in FIG. 2 may be transmitted by the second TRP 205-*b* to the UE 215 as part of a two PDCCH multi-TRP configuration. In some cases, data may be transmitted from a TRP 205 to the UE 215 using physical downlink shared channel (PDSCH) signals between the respective TRP 205 and the UE 215. Each of the PDCCH and PDSCH may use the same or different TCI states for configuring beam transmissions between a TRP 205 and UE 215. In some cases, one or more of the beam configurations between a TRP 205 and UE 215 may need to be updated over time, for example, if the TRP 205 or UE 215 changes location, signal interference occurs, or the like. The beam configurations may be updated by the TRP 205 transmitting updated TCI states to the UE 215, for example, via one or more MAC-CE transmissions.

In some cases, each TRP 205 may update its own TCI states at the UE 215 using configured communications channels between each TRP 205 and the UE 215. For example, the MAC-CE 225 from the first TRP 205-*a* may be used to update TCI states for the first TRP 205-*a* and a MAC-CE from the second TRP 205-*b* (not shown) may be used to update TCI states for the second TRP 205-*b*. The first TRP 205-*a* may transmit a first PDCCH signal 220 to the UE 215 that schedules the first MAC-CE 225. The first PDCCH signal 220 may include an indication that associates the first MAC-CE 225 with the first TRP 205-*a* such that the UE 215 can distinguish a MAC-CE being sent from the first TRP 205-*a* from a MAC-CE begin sent from the second TRP 205-*b*. Accordingly, in some cases, the first TRP 205-*a* may transmit the MAC-CE 225 without changing the structure of the MAC-CE (e.g., including a TRP 205 identifier). In some examples, the content of the MAC-CE could also be changed/used to indicate an association between the MAC-CE 225 and a TRP 205 instead of or in addition to the separate indication in the PDCCH signal 220.

In response to receiving the MAC-CE 225, the UE 215 may update the TCI states for beam configurations associated with the first TRP 205-*a* and may send an acknowledgement 230 to the first TRP 205-*a* indicating that the TCI state for the first TRP 205-*a* has been updated. In some cases, the UE 215 may also send a second acknowledgement 235 to the second TRP 205-*b* that indicates that a TCI state for the first TRP 205-*a* has been updated. Sending the second acknowledgement 235 to the second TRP 205-*b* may be beneficial for a variety of reasons. For instance, doing so may signal to the second TRP 205-*b* that the current beam parameters between the UE 215 and the second TRP 205-*b* may need to be updated, for example, if the UE 215 has moved or the current signal is being blocked by another object. Similarly, the second acknowledgement 235 may provide redundancy; for example, if the first TRP did not receive the acknowledgement 230, the second TRP 205-*b* may communicate (e.g., via a backhaul link) that the TCI for the first TRP 205-*a* has been updated.

In some cases, the UE 215 may transmit the second acknowledgement 235 to the second TRP 205-*b* using physical uplink control channel (PUCCH) resources that are based on HARQ parameters specified in the PDCCH signal 220. For example, the UE 215 may determine the ACK/NACK resource indicator (ARI), K1 value for determining the time between receiving the PDCCH signal 220 and transmitting the first acknowledgement 230, or both, to determine PUCCH resources for transmitting the second acknowledgement 235. In some cases, the UE 215 may transmit the second acknowledgement 235 using the ARI and K1 values specified in the PDCCH signal 220. In other cases, the UE 215 may transmit the second acknowledgement 235 by modifying the interpretation of the K1 value and ARI for transmitting the first acknowledgement 230. For example, if the UE 215 is determining that the K1 for transmitting the first acknowledgement 230 is a first number of slots, the UE 215 may modify this or interpret the K1 value different for sending the second acknowledgment 235. For example, the UE 215 may modify the K1 value for the second TRP 205-*b* to transmit at a defined number of slots later than what was determined for the first TRP 205-*a*. This may occur when the resources for communications between the UE 215 and the second TRP 205-*b* are configured differently than communications between the first TRP 205-*a* and the UE 215.

In further examples, the UE 215 may transmit the second acknowledgement 235 at the same or a later time than it sends the first acknowledgement 230 to the first TRP 205-*a*. For example, the UE 215 may determine a K1 value for transmitting the second acknowledgement 235 at a time offset than is greater than the K1 value for sending the first acknowledgement 230. In further examples, the acknowledgements 230, 235 may be transmitted using resources that are configured or dedicated for transmitting ACK/NACK feedback to the MAC-CE (e.g., MAC-CE 225). In some cases, the MAC-CE acknowledgements (or negative acknowledgments) may be transmitted on resources that are different than ACK/NACK resources for data transmissions.

Figure 3:
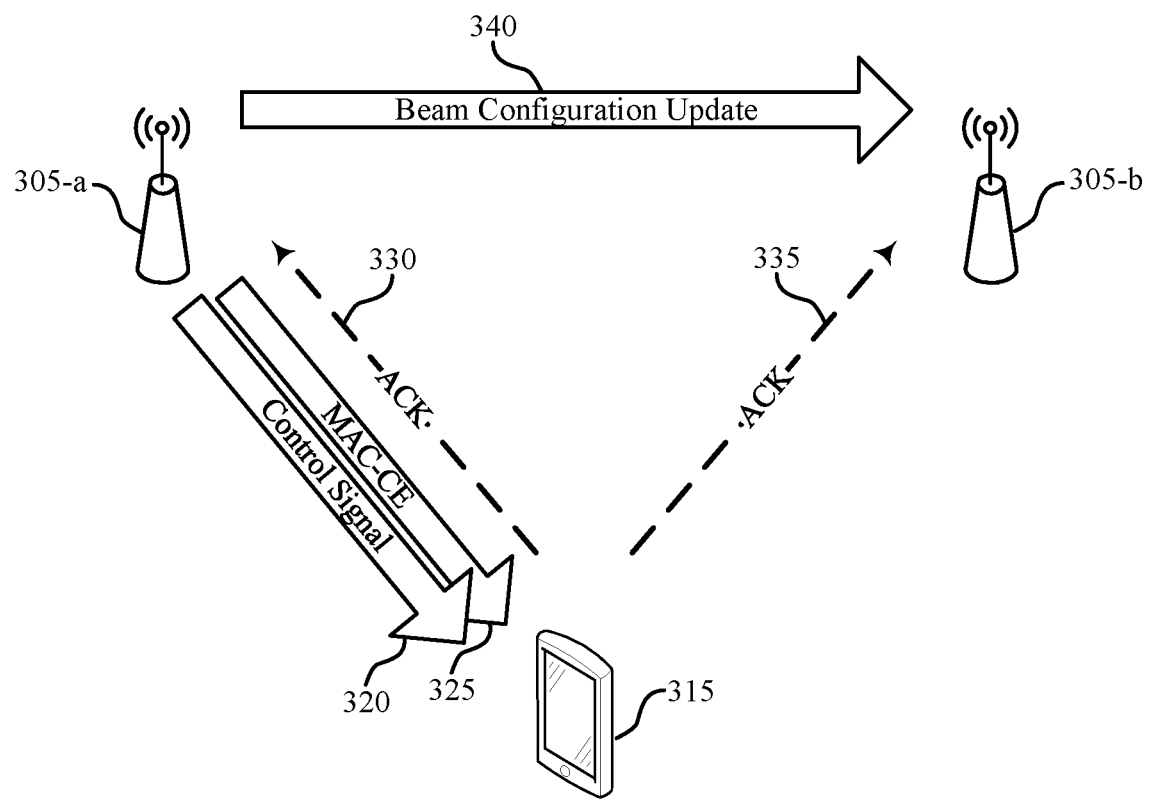
FIG. 3 illustrates an example of a wireless communications system that supports TRPs updating beam states for other TRPs in a multiple TRP system in accordance with aspects of the present disclosure.

FIG. 3 illustrates an example of a wireless communications system 300 that support TRPs updating beams states for other TRPs in a multiple TRP system in accordance with aspects of the present disclosure. In some examples, the wireless communications system 300 may implement aspects of wireless communications system 100 or 200. The wireless communications system 300 may include multiple TRPs 305, which may be examples of base stations 105, access network transmission entities 145, or TRPs 205 described with reference to FIGS. 1 and 2, and a UE 315, which may be an example of UEs 115 or UE 215 described with reference to FIGS. 1 and 2. The wireless communications system 300 provides examples of control signals 320, MAC-CE 325, acknowledgement (ACK/NACK) signals 330, 335, and beam configuration updates 340 that may be transmitted between the TRPs 305 and UE 315 when a TRP 305 (e.g., 305-a) updates its own beam configuration (e.g., TCI state) or the beam configuration for another TRP 305 (e.g., 305-b) for communications with the UE 315.

Each TRP 305 may send a MAC-CE 325 that includes a beam update for itself or other TRPs 305. This may be beneficial if, for example, a communications link to one TRP (e.g., second TRP 305-b) has weakened and a different TRP (e.g., first TRP 305-a) may update a beam configuration from the TRP with the weakened link. The first TRP 305-a may transmit a control signal 320 (e.g., PDCCH signal) to the UE 315 that indicates resources for the UE 315 to receive the MAC-CE 325. The first TRP 305-a may transmit the MAC-CE 325 to the UE 315, where the MAC-CE 325 includes an updated TCI state for the second TRP 305-b and an indication that the TCI state is associated with the second TRP 305-b. Accordingly, the UE 315 may receive the indication and determine that the TCI state received from the first TRP 305-a is associated with the second TRP 305-b. In some cases, the first TRP 305-a may transmit a MAC-CE 325 to the UE 315 that includes multiple TCI state updates for different TRPs. For example, the first TRP 305-a may transmit a MAC-CE 325 with a first TCI state associated with the first TRP 305-a and a second TCI state associated with the second TRP 305-b. Accordingly, the MAC-CE 325 may include a first indication that the UE 315 may use to associate the first TCI state with the first TRP 305-a and a second indication that the UE 315 may use to associate the second TCI state with the second TRP 305-b.

In response to receiving the MAC-CE 325, the UE 315 may update the TCI states for beam configurations associated with the first TRP 305-a, the second TRP 305-b, or both and may send an acknowledgement to one or more of the TRPs 305 indicating that the TCI states for the first TRPs 205 have been updated. For example, the UE 315 may transmit an acknowledgement 330 to the first TRP 305-a but not to the second TRP 305-b. In other examples, the UE 315 may transmit an acknowledgement 335 to the second TRP 305-b but not to the first TRP 305-a. In yet other examples, the UE 315 may transmit acknowledgements 330, 335 to both the first and second TRPs 305. In some cases, the first TRP 305-a may transmit the beam configuration update 340 (e.g., TCI update) to the second TRP 305-b. For example, the first TRP 305-a may transmit the TCI update in response to receiving the first acknowledgement from the UE 315.

In some cases, the UE 315 may transmit the acknowledgements 330, 335 to the TRPs 305 using PUCCH resources that are based on HARQ parameters specified in the PDCCH signal 320. For example, the UE 315 may determine the ARI, K1 value for determining the time between receiving the PDCCH 320 and transmitting the first acknowledgement 330, or both to determine PUCCH resources for transmitting the one or more acknowledgements 330, 335. In some cases, the UE 315 may transmit the one or more acknowledgements 330, 335 using the ARI and K1 values specified in the PDCCH signal 320. In other cases, the UE 315 may transmit the second acknowledgements 335 by modifying the interpretation of the K1 value and ARI used for transmitting the first acknowledgement 330. For example, if the UE 315 determines that the K1 for transmitting the first acknowledgement 330 is a first number of slots, the UE 315 may modify this or interpret the K1 value different for sending the second acknowledgment 335. For example, the UE 315 may modify the K1 value for the second TRP 305-b to transmit at a defined number of slots later than what was determined for the first TRP 305-a. This may occur when the resources for communications between the UE 315 and the second TRP 305-b are configured differently than communications between the first TRP 305-a and the UE 315.

In further examples, the UE 315 may transmit the second acknowledgement 335 at the same or a later time than it sends the first acknowledgement 330 to the first TRP 305-a. For example, the UE 315 may determine a K1 value for transmitting the second acknowledgement 335 at a time offset that is greater than the K1 value for sending the first acknowledgement 330. In further examples, the acknowledgements 330, 335 may be transmitted using resources that are configured or dedicated for transmitting ACK/NACK feedback to the MAC-CE signal (e.g., MAC-CE signal 325). In some cases, the MAC-CE acknowledgements (or negative acknowledgments) may be transmitted on resources that are different than ACK/NACK resources for data transmissions.

Figures 4A, 4B:
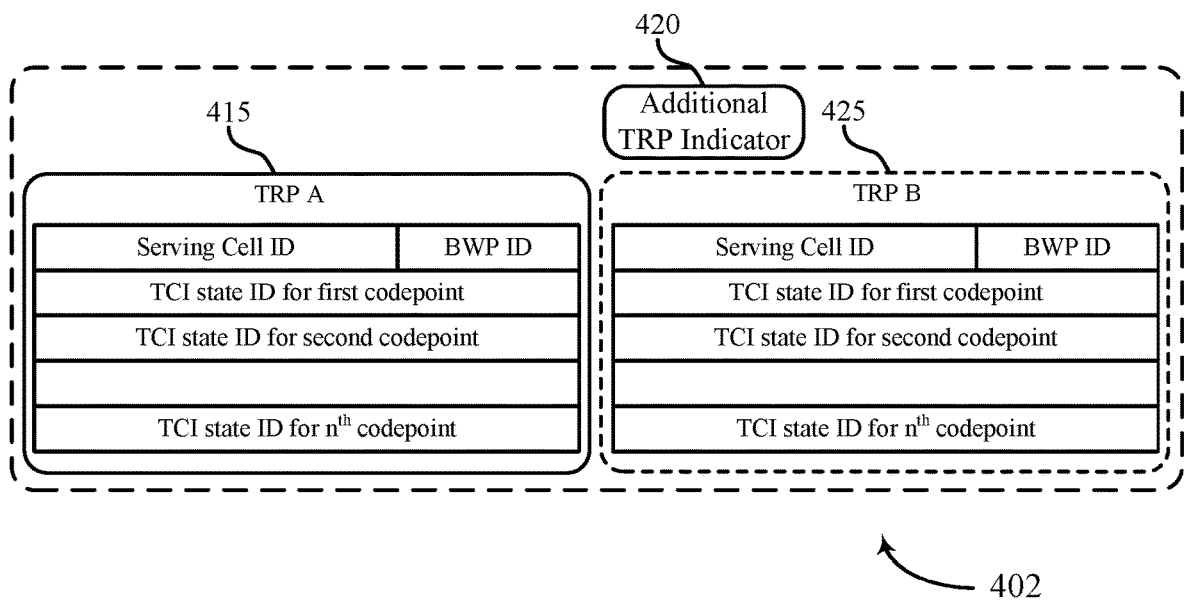
FIGS. 4A-B illustrate examples of MAC-CE payload content that supports beam updating for multiple TRPs in accordance with aspects of the present disclosure.

FIGS. 4A-B illustrate examples of MAC-CE payload contents 401 and 402 that support beam updating for multiple transmission reception points in accordance with aspects of the present disclosure. In some examples, the MAC-CE payload contents 401 and 402 may implement aspects of wireless communication systems 100, 200 or 300. The MAC-CE payload contents 401 and 402 may illustrate examples of payload data included in MAC-CE 325 described with reference to FIG. 3. In some cases, the MAC-CE payload contents 401 and 402 illustrate examples of including indications for associating TCI states with specific TRPs. The MAC-CE payload content 401 illustrates an example that includes an indication that associates each TCI state included in the MAC-CE with a specific TRP. The MAC-CE payload content 402 illustrates another example that includes a first set of beam configuration data (e.g., TCI states) that is associated with a first TRP (e.g., first TRP 305-a) and an optional second set of beam configuration data (e.g., TCI states) that is associated with a different TRP (e.g., second TRP-305-b). Examples described herein are illustrated in the context of two TRPs, however the concepts described can be applied to greater numbers of TRPs.

The MAC-CE payload contents 401 may include a first set of indicator values 405 that are used to identify a specific TRP. For example, a first value (e.g., 0) may be associated with a first TRP (e.g., first TRP 305-a) and a second value (e.g., 1) may be associated with a second TRP (e.g., second TRP 305-b). The MAC-CE payload contents 401 may also include a second set of beam configuration information 410 (e.g., TCI states). Each beam configuration information 410 may be associated with an indictor value 405, thereby associating that beam configuration with a specific TRP. For example, a first TCI state included in the set of beam configuration information 410 (e.g., TCI state ID for first codepoint of TRP A) may be associated with a first indicator value 405 (e.g., 0) thereby associating this TCI with a specific TRP (e.g., the first TRP 305-a).

The MAC-CE payload contents 402 may provide another example of formatting beam configuration information with the MAC-CE. In this example, the MAC-CE payload contents 402 may include a first set of beam configuration data 415 that is associated with a first TRP (e.g., the first TRP 305-a), which may always be included in the MAC-CE. The MAC-CE payload contents may also include an additional TRP indicator 420 which alters the UE as to whether the MAC-CE includes beam configuration data (e.g., TCI states) for other TRPs. If the indictor is set to a first value (e.g., 0) then a second set of beam configuration data 425 is not present, and if the indicator is set to a second value (e.g., 1) then the second set of beam configuration data 425 is present. Accordingly, a UE may associate different TCI states included within the MAC-CE with specific TRPs based on the format of the data in the MAC-CE and presence of the additional TRP indicator.

Figure 5:
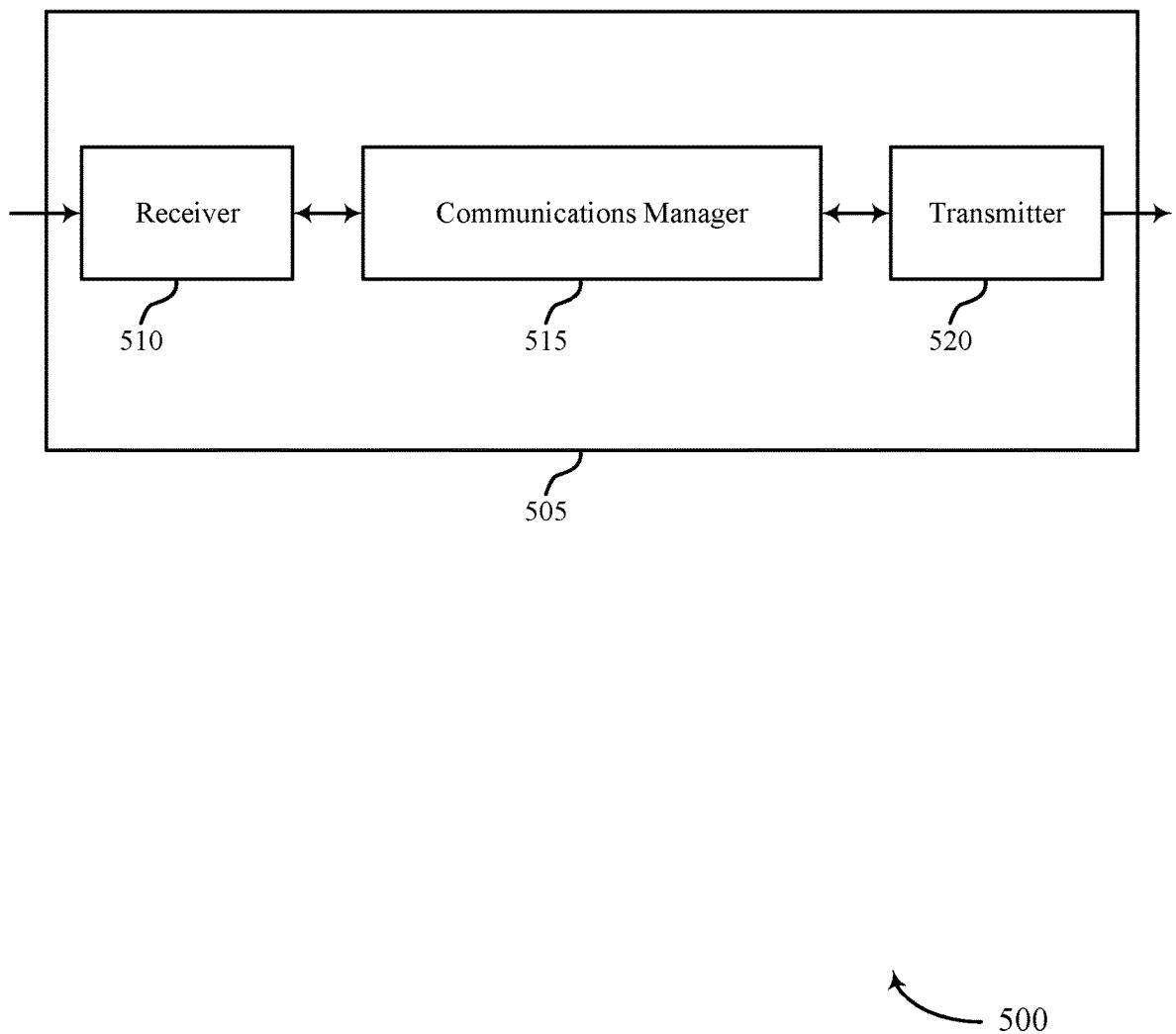
FIGS. 5 and 6 show block diagrams of devices that support beam updating for multiple TRPs in accordance with aspects of the present disclosure.

FIG. 5 shows a block diagram 500 of a device 505 that supports beam updating for multiple TRPs in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to beam updating for multiple TRPs, etc.). Information may be passed on to other components of the device 505. The receiver 510 may be an example of aspects of the transceiver 820 described with reference to FIG. 8. The receiver 510 may utilize a single antenna or a set of antennas.

In some implementations the communications manager 515 may receive a configuration message configuring the UE to receive control signals from a first TRP and a second TRP of a TRP cluster, receive a first control signal from the first TRP indicating resources for receiving a MAC-CE, where the first control signal includes an indication that associates the MAC-CE with the first TRP, receive the MAC-CE based on receiving the first control signal, where the MAC-CE includes a beam update indication for the first TRP, and transmit a first acknowledgment to at least the first TRP based on receiving the MAC-CE.

The actions performed by the UE communications manager 515 as described herein may be implemented to realize one or more potential advantages. One implementation may allow a UE 115 to maintain communications with a base station 105 through one or more TRPs of a TRP cluster when communications with some of the TRPs of the TRP cluster are blocked or otherwise fail. Additionally or alternatively, the UE 115 may further receive configuration data for TRPs whose signal has been blocked or failed through other TRPs of the TRP cluster.

One example of an advantage of transmitting a second acknowledgment to the second TRP based on receiving the MAC-CE, where the second acknowledgment indicates that the UE received the beam update indication from the first TRP, is that the second acknowledgment may indicate to the second TRP that a condition of the UE has changed and the second UE should evaluate its beam configuration for communications with the UE.

The communications manager 515 may also receive a configuration message configuring the UE to receive control signals from a first TRP and a second TRP of a TRP cluster, receive a first control signal from the first TRP indicating resources for receiving a MAC-CE, receive the MAC-CE from the first TRP, where the MAC-CE includes a first beam update indication for the second TRP and an indication that associates the MAC-CE with the second TRP, and transmit a first acknowledgment based on receiving the MAC-CE. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
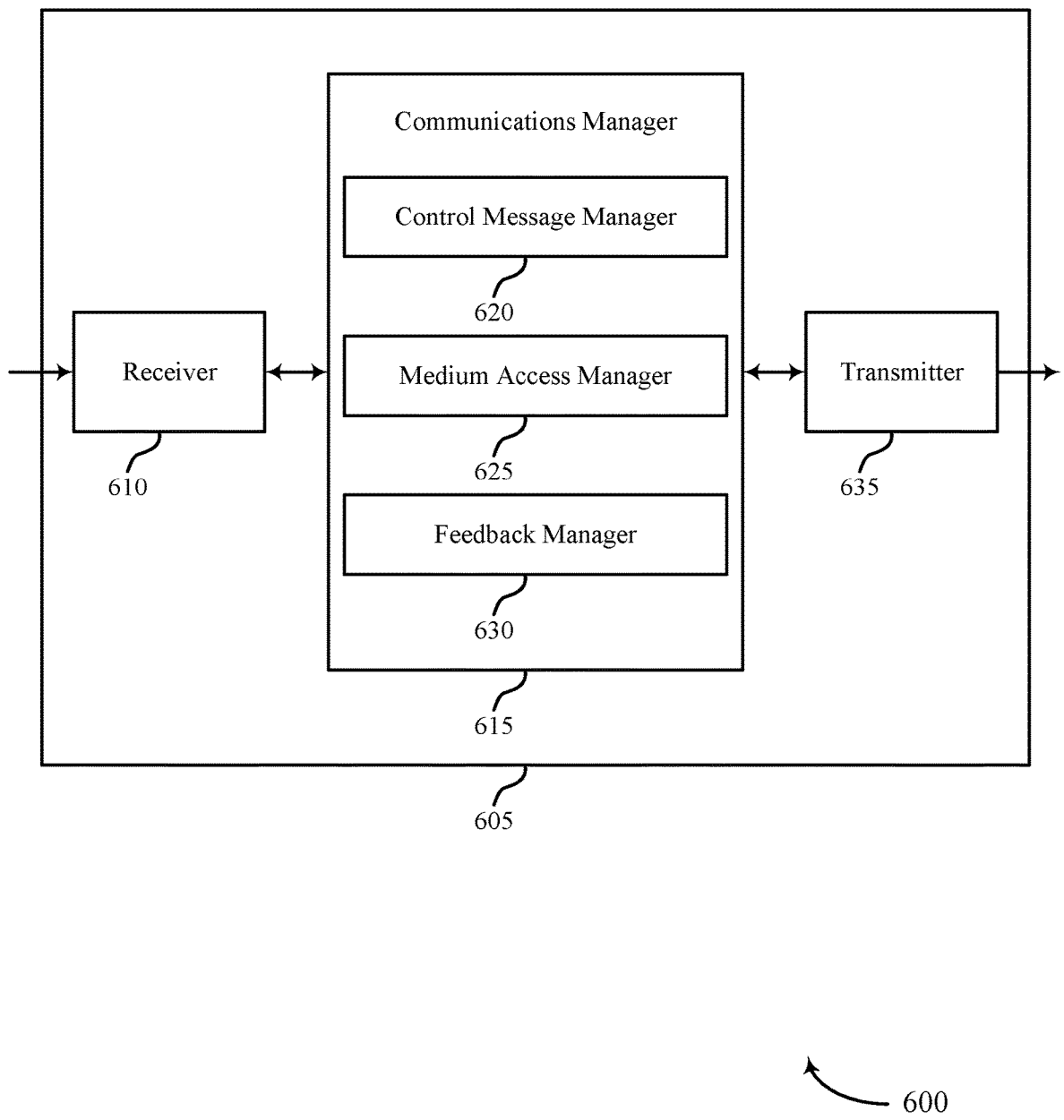

FIG. 6 shows a block diagram 600 of a device 605 that supports beam updating for multiple TRPs in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to beam updating for multiple TRPs, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a control message manager 620, a medium access manager 625, and a feedback manager 630. The communications manager 615 may be an example of aspects of the communications manager 810 described herein.

The control message manager 620 may receive a configuration message configuring the UE to receive control signals from a first TRP and a second TRP of a TRP cluster and receive a first control signal from the first TRP indicating resources for receiving a MAC-CE, where the first control signal includes an indication that associates the MAC-CE with the first TRP. The control message manager 620 may receive a configuration message configuring the UE to receive control signals from a first TRP and a second TRP of a TRP cluster and receive a first control signal from the first TRP indicating resources for receiving a MAC-CE.

The medium access manager 625 may receive the MAC-CE based on receiving the first control signal, where the MAC-CE includes a beam update indication for the first TRP. The medium access manager 625 may receive the MAC-CE from the first TRP, where the MAC-CE includes a first beam update indication for the second TRP and an indication that associates the MAC-CE with the second TRP.

The feedback manager 630 may transmit a first acknowledgment to at least the first TRP based on receiving the MAC-CE. The feedback manager 630 may transmit a first acknowledgment based on receiving the MAC-CE.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
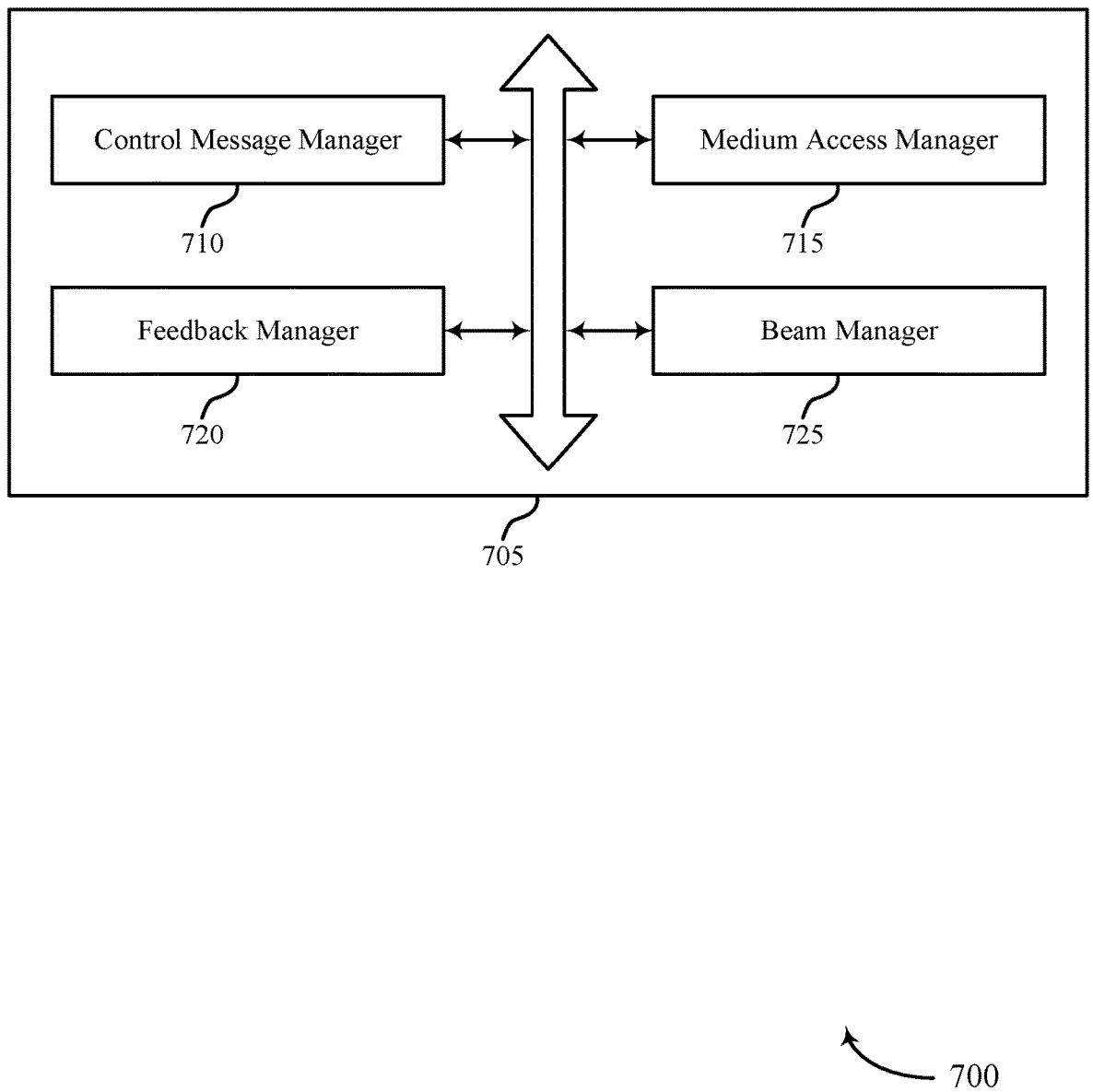
FIG. 7 shows a block diagram of a communications manager that supports beam updating for multiple TRPs in accordance with aspects of the present disclosure.

FIG. 7 shows a block diagram 700 of a communications manager 705 that supports beam updating for multiple TRPs in accordance with aspects of the present disclosure. The communications manager 705 may be an example of aspects of a communications manager 515, a communications manager 615, or a communications manager 810 described herein. The communications manager 705 may include a control message manager 710, a medium access manager 715, a feedback manager 720, and a beam manager 725. Each of these modules may communicate, directly or indirectly, with one another (e.g., via one or more buses).

The control message manager 710 may receive a configuration message configuring the UE to receive control signals from a first TRP and a second TRP of a TRP cluster. In some examples, receiving a first control signal from the first TRP indicating resources for receiving a MAC-CE, where the first control signal includes an indication that associates the MAC-CE with the first TRP.

In some examples, the control message manager 710 may receive a configuration message configuring the UE to receive control signals from a first TRP and a second TRP of a TRP cluster. In some examples, the control message manager 710 may receive a first control signal from the first TRP indicating resources for receiving a MAC-CE.

The medium access manager 715 may receive the MAC-CE based on receiving the first control signal, where the MAC-CE includes a beam update indication for the first TRP. In some examples, receiving the MAC-CE from the first TRP, where the MAC-CE includes a first beam update indication for the second TRP and an indication that associates the MAC-CE with the second TRP.

In some cases, the beam update indication includes a transmission control indicator state. In some aspects, the MAC-CE includes a first TRP indicator for indicating that the first beam update indication is associated with the second TRP. In some cases, a second beam update indicator for the first TRP. In some examples, a second TRP indicator for indicating that the second beam update indicator is associated with the first TRP. In some cases, a first set of fields including a beam update indication for the second TRP. In some aspects, a second set of fields including a beam update indication for the first TRP. In some cases, a TRP indicator filed for indicating whether the beam update indication for the second TRP is included in the MAC-CE.

The feedback manager 720 may transmit a first acknowledgment to at least the first TRP based on receiving the MAC-CE. In some examples, the feedback manager 720 may transmit a first acknowledgment based on receiving the MAC-CE. In some examples, the feedback manager 720 may transmit a second acknowledgment to the second TRP based on receiving the MAC-CE, where the second acknowledgment indicates that the UE received the beam update indication from the first TRP.

In some cases, the first acknowledgment confirms that a beam configuration was updated for communications with the second TRP. In some examples, the first acknowledgment is transmitted by the UE to the first TRP to be communicated with the second TRP. In some cases, the first acknowledgment is transmitted to the first TRP, the second TRP or both.

The beam manager 725 may transmit the first acknowledgment to the first TRP using a first uplink beam. In some examples, the beam manager 725 may transmit the second acknowledgment to the second TRP using a second uplink beam, where the first and second uplink beams each include the same time and frequency resources based on the first control signal. In some cases, the beam manager 725 may transmit the first acknowledgment to the first TRP using first uplink resources that are based on a resource indicator and an acknowledgment timing offset in the first control signal. In some examples, the beam manager 725 may transmit the second acknowledgment to the second TRP using second uplink resources that are based on modified parameters for the resource indicator and the acknowledgment timing offset in the first control signal.

In some examples, the beam manager 725 may update a beam configuration at the UE based on the beam update indication. In some cases, the beam manager 725 may transmit the first acknowledgment to the first TRP using a first uplink beam. In some examples, the beam manager 725 may transmit a second acknowledgment to the second TRP using a second uplink beam, where the first and second uplink beams each include the same time and frequency resources based on the first control signal. In some cases, the beam manager 725 may transmit the first acknowledgment to the first TRP using first uplink resources that are based on a resource indicator and an acknowledgment timing offset in the first control signal. In some aspects, the beam manager 725 may transmit a second acknowledgment to the second TRP using second uplink resources that are based on modified parameters for the resource indicator and the acknowledgment timing offset in the first control signal.

In some cases, the second uplink resources are based on configured resources for transmissions between the UE and the second TRP. In some aspects, the acknowledgment timing offset for the second acknowledgment is sent using a modified acknowledgment timing offset that is greater than a first acknowledgment timing offset for the first acknowledgment. In some cases, the second acknowledgment is transmitted to the second TRP using dedicated resources for communicating MAC-CE confirmations. In some aspects, the acknowledgment timing offset for the second uplink resources is sent using a modified acknowledgment timing offset that is greater than a first acknowledgment timing offset for the first uplink resources. In some examples, the first acknowledgment is transmitted to the second TRP using dedicated resources for communicating MAC-CE confirmations.

Figure 8:
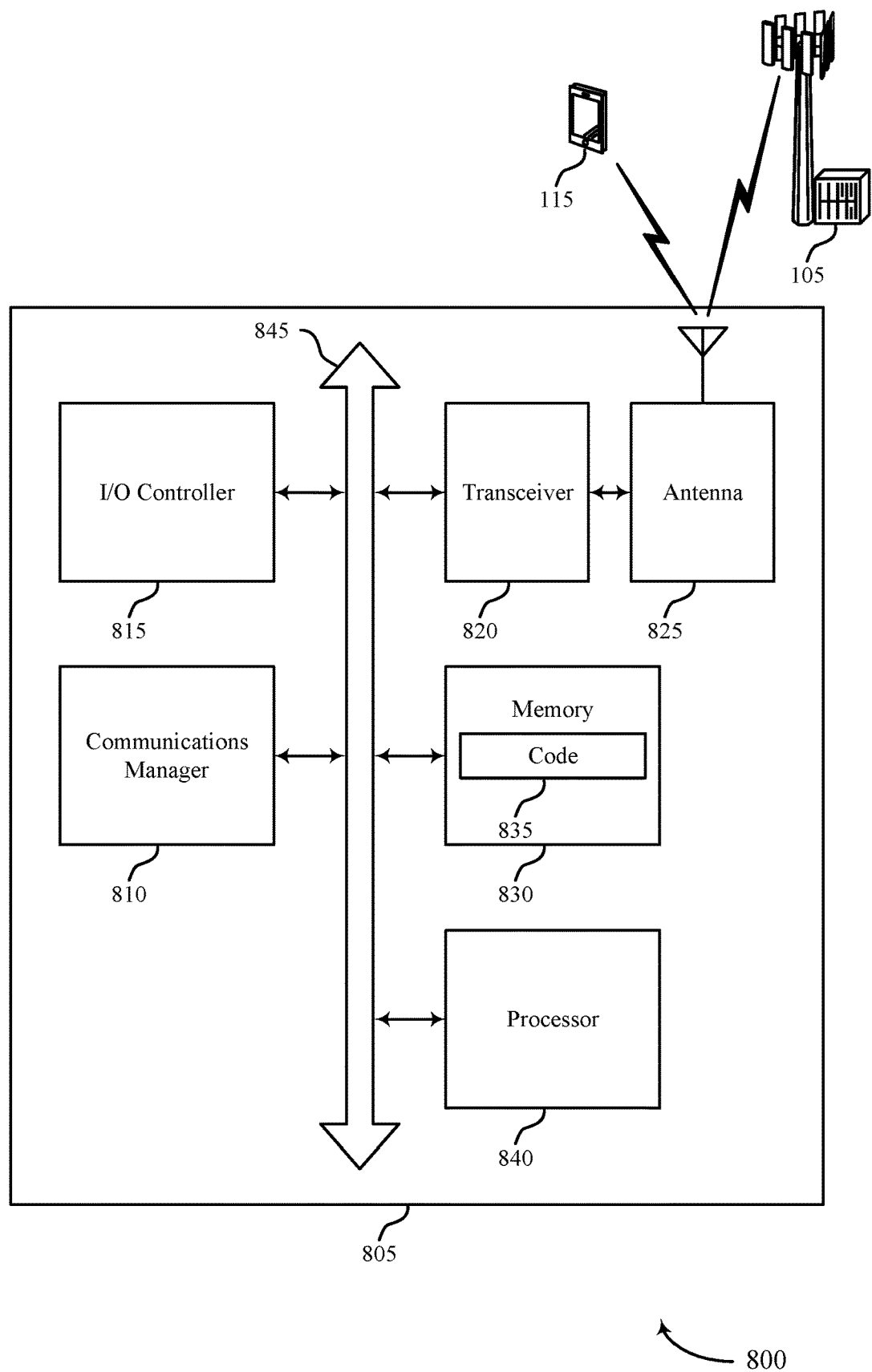
FIG. 8 shows a diagram of a system including a device that supports beam updating for multiple TRPs in accordance with aspects of the present disclosure.

FIG. 8 shows a diagram of a system 800 including a device 805 that supports beam updating for multiple TRPs in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration message configuring the UE to receive control signals from a first TRP and a second TRP of a TRP cluster, receive a first control signal from the first TRP indicating resources for receiving a MAC-CE, where the first control signal includes an indication that associates the MAC-CE with the first TRP, receive the MAC-CE based on receiving the first control signal, where the MAC-CE includes a beam update indication for the first TRP, and transmit a first acknowledgment to at least the first TRP based on receiving the MAC-CE. Based on receiving the MAC-CE, a processor of a UE 115 (e.g., controlling the receiver 510, the transmitter 520, or the transceiver 820) may efficiently update TCI state information for each TRP of a TRP cluster by each TRP of a cluster updating its own TCI states thereby reducing signaling between TRPs of a cluster.

Some implementations include transmitting a second acknowledgment to the second TRP based on receiving the MAC-CE, where the second acknowledgment indicates that the UE received the beam update indication from the first TRP. Based on receiving the second acknowledgement, a processor of the second TRP (e.g., controlling the receiver 510, the transmitter 520, or the transceiver 820) may efficiently update a TCI state for the second TRP before a communications link with the UE degrades or fails.

The communications manager 810 may also receive a configuration message configuring the UE to receive control signals from a first TRP and a second TRP of a TRP cluster, receive a first control signal from the first TRP indicating resources for receiving a MAC-CE, receive the MAC-CE from the first TRP, where the MAC-CE includes a first beam update indication for the second TRP and an indication that associates the MAC-CE with the second TRP, and transmit a first acknowledgment based on receiving the MAC-CE.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam updating for multiple TRPs).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
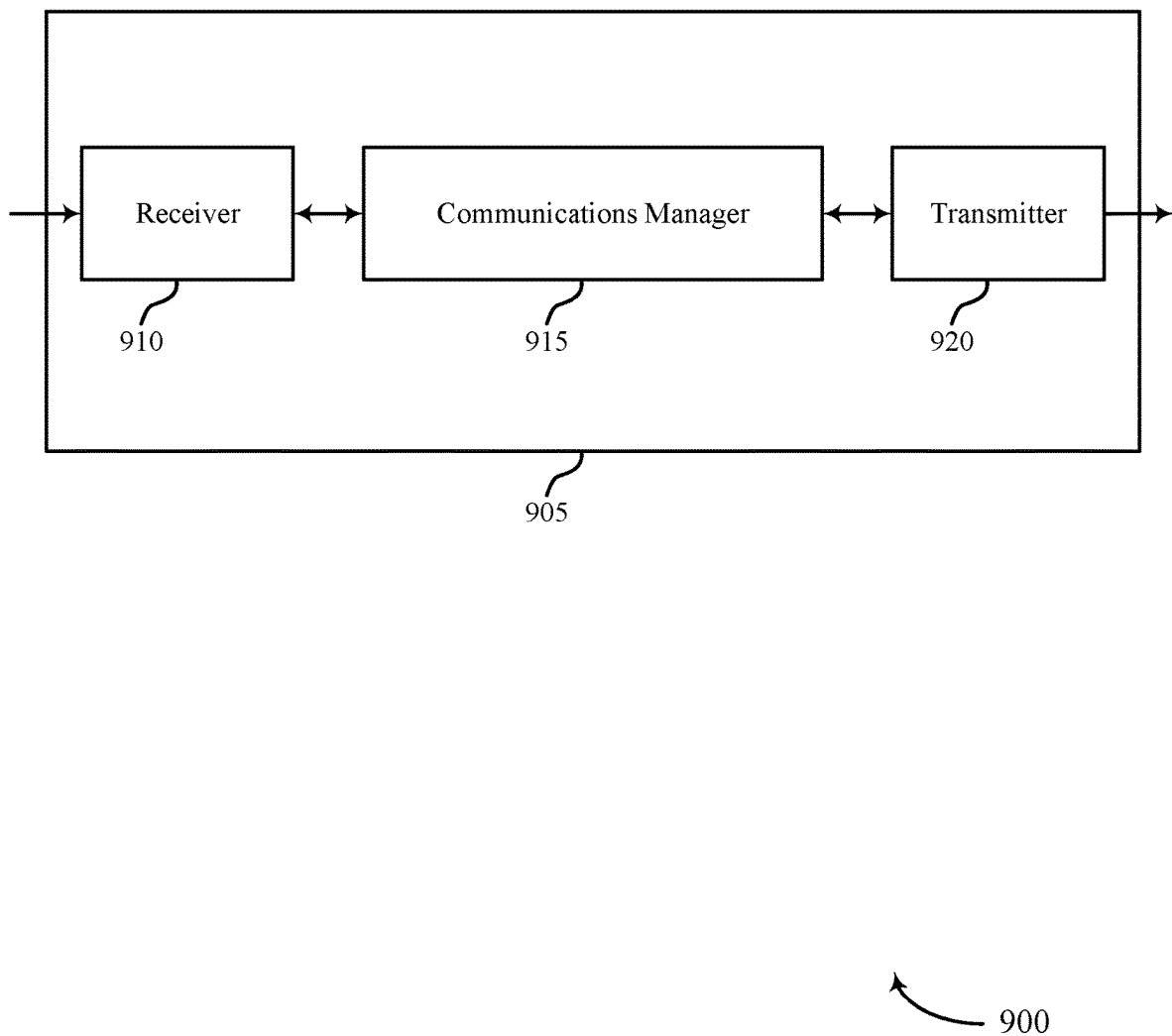
FIGS. 9 and 10 show block diagrams of devices that support beam updating for multiple TRPs in accordance with aspects of the present disclosure.

FIG. 9 shows a block diagram 900 of a device 905 that supports beam updating for multiple TRPs in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to beam updating for multiple TRPs, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a configuration message to a UE that configures the UE to receive control signals from a first TRP and a second TRP of the TRP cluster, transmit a first control signal from the first TRP of the TRP cluster indicating resources for receiving a MAC-CE, where the first control signal includes an indication that associates the MAC-CE with the first TRP, transmit the MAC-CE based on transmitting the first control signal, where the MAC-CE includes a beam update indication for the first TRP, and receive a first acknowledgment from the UE based on transmitting the MAC-CE. The communications manager 915 may also transmit a configuration message to a UE that configures the UE to receive control signals from a first TRP and a second TRP of the TRP cluster, transmit a first control signal from the first TRP indicating resources for receiving a MAC-CE, transmit the MAC-CE from the first TRP, where the MAC-CE includes a first beam update indication for the second TRP and an indication that associates the MAC-CE with the second TRP, and receive a first acknowledgment at the TRP cluster based on transmitting the MAC-CE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
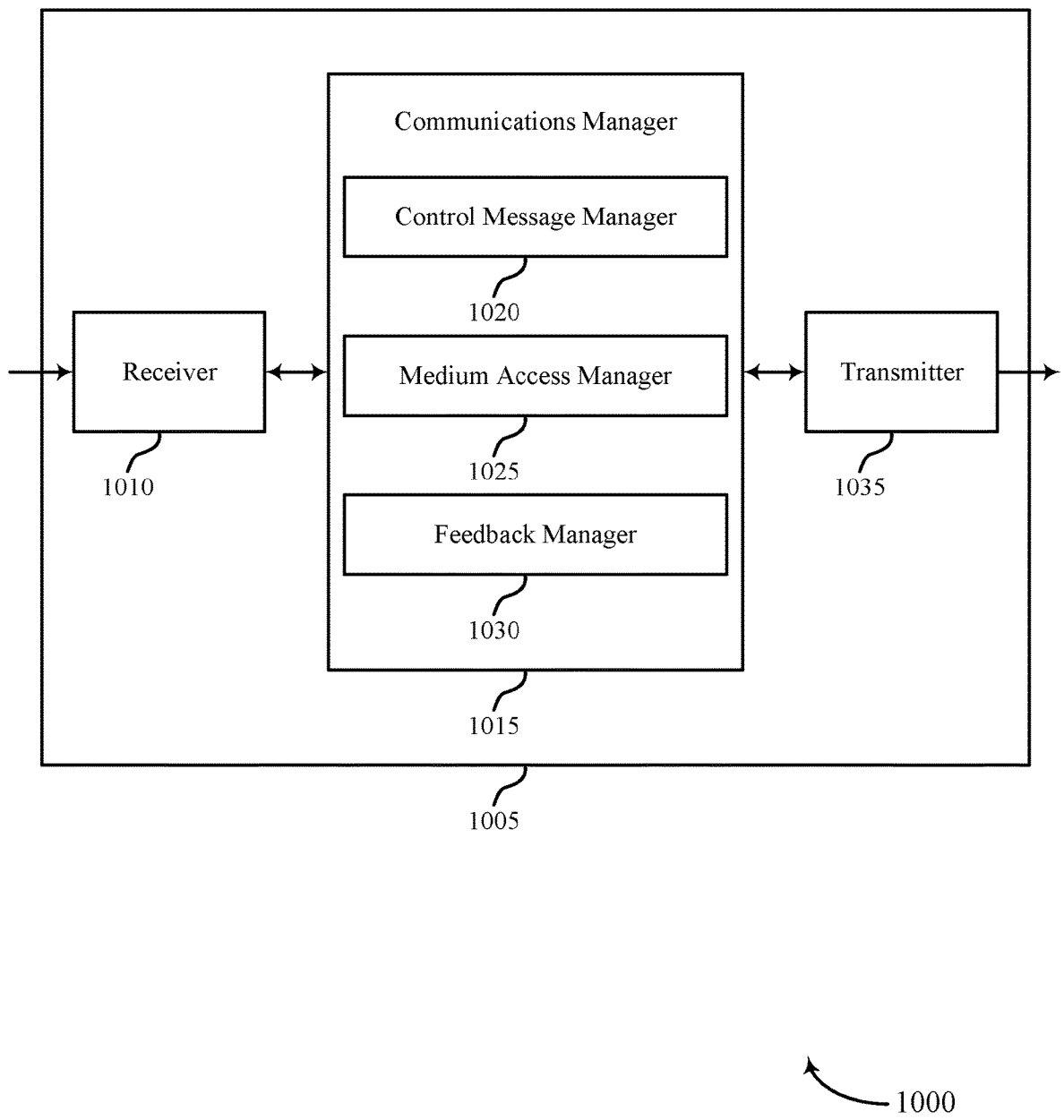

FIG. 10 shows a block diagram 1000 of a device 1005 that supports beam updating for multiple TRPs in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to beam updating for multiple TRPs, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control message manager 1020, a medium access manager 1025, and a feedback manager 1030. The communications manager 1015 may be an example of aspects of the communications manager 1210 described herein.

The control message manager 1020 may transmit a configuration message to a UE that configures the UE to receive control signals from a first TRP and a second TRP of the TRP cluster and transmit a first control signal from the first TRP of the TRP cluster indicating resources for receiving a MAC-CE, where the first control signal includes an indication that associates the MAC-CE with the first TRP. The control message manager 1020 may transmit a configuration message to a UE that configures the UE to receive control signals from a first TRP and a second TRP of the TRP cluster and transmit a first control signal from the first TRP indicating resources for receiving a MAC-CE.

The medium access manager 1025 may transmit the MAC-CE based on transmitting the first control signal, where the MAC-CE includes a beam update indication for the first TRP. The medium access manager 1025 may transmit the MAC-CE from the first TRP, where the MAC-CE includes a first beam update indication for the second TRP and an indication that associates the MAC-CE with the second TRP.

The feedback manager 1030 may receive a first acknowledgment from the UE based on transmitting the MAC-CE. The feedback manager 1030 may receive a first acknowledgment at the TRP cluster based on transmitting the MAC-CE.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
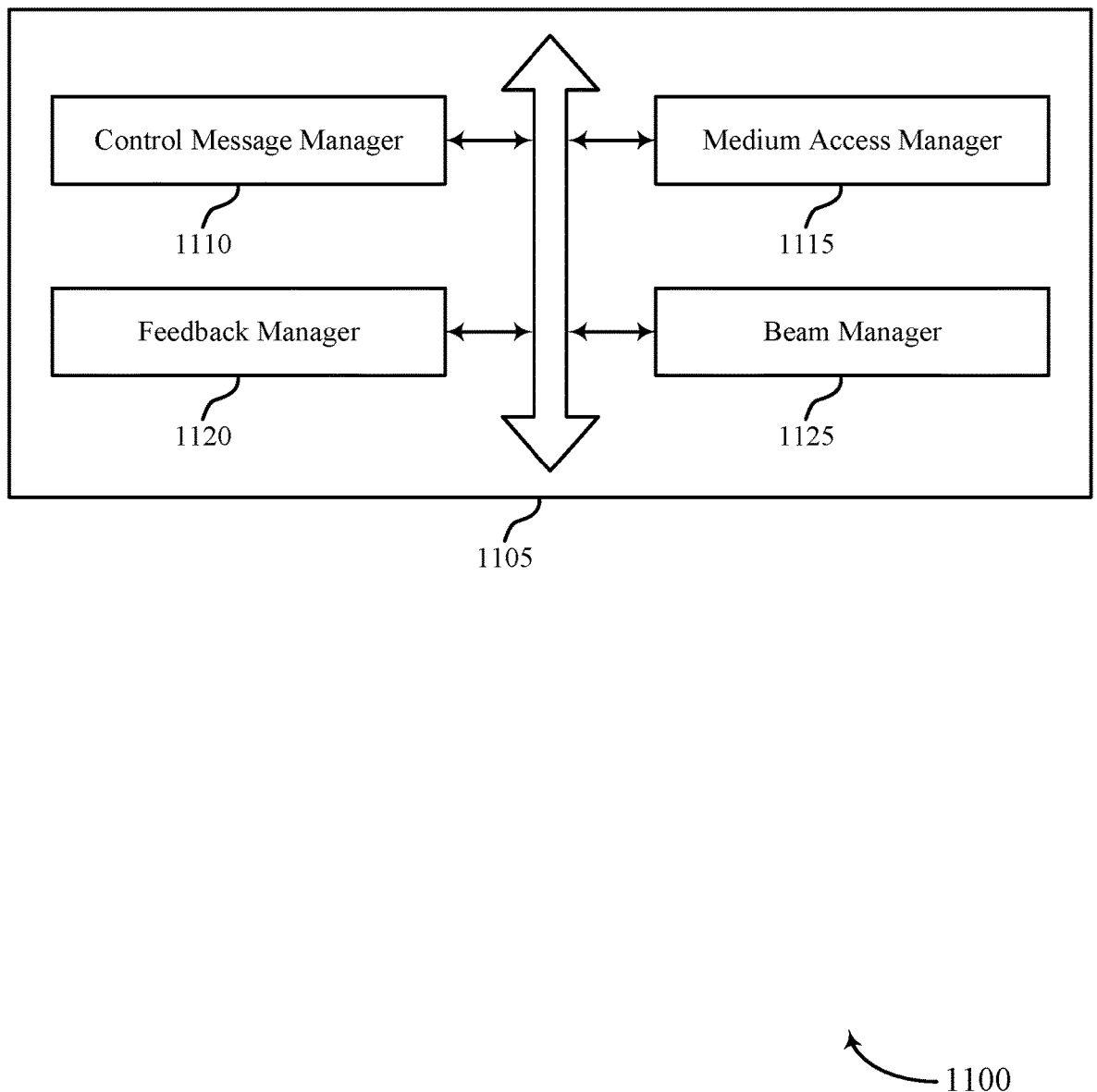
FIG. 11 shows a block diagram of a communications manager that supports beam updating for multiple TRPs in accordance with aspects of the present disclosure.

FIG. 11 shows a block diagram 1100 of a communications manager 1105 that supports beam updating for multiple TRPs in accordance with aspects of the present disclosure. The communications manager 1105 may be an example of aspects of a communications manager 915, a communications manager 1015, or a communications manager 1210 described herein. The communications manager 1105 may include a control message manager 1110, a medium access manager 1115, a feedback manager 1120, and a beam manager 1125. Each of these modules may communicate, directly or indirectly, with one another (e.g., via one or more buses).

The control message manager 1110 may transmit a configuration message to a UE that configures the UE to receive control signals from a first TRP and a second TRP of the TRP cluster. In some examples, transmitting a first control signal from the first TRP of the TRP cluster indicating resources for receiving a MAC-CE, where the first control signal includes an indication that associates the MAC-CE with the first TRP. In some examples, the control message manager 1110 may transmit a configuration message to a UE that configures the UE to receive control signals from a first TRP and a second TRP of the TRP cluster. In some examples, the control message manager 1110 may transmit a first control signal from the first TRP indicating resources for receiving a MAC-CE.

The medium access manager 1115 may transmit the MAC-CE based on transmitting the first control signal, where the MAC-CE includes a beam update indication for the first TRP. In some examples, transmitting the MAC-CE from the first TRP, where the MAC-CE includes a first beam update indication for the second TRP and an indication that associates the MAC-CE with the second TRP.

In some cases, the beam update indication includes a transmission control indicator state. In some cases, the MAC-CE includes a first TRP indicator for indicating that the first beam update indication is associated with the second TRP. In some cases, a second beam update indicator for the first TRP. In some cases, a second TRP indicator for indicating that the second beam update indicator is associated with the first TRP. In some cases, a first set of fields including a beam update indication for the second TRP. In some cases, a second set of fields including a beam update indication for the first TRP. In some cases, a TRP indicator filed for indicating whether the beam update indication for the second TRP is includes in the MAC-CE.

The feedback manager 1120 may receive a first acknowledgment from the UE based on transmitting the MAC-CE. In some examples, the feedback manager 1120 may receive a first acknowledgment at the TRP cluster based on transmitting the MAC-CE. In some examples, the feedback manager 1120 may receive a second acknowledgment at the second TRP of the TRP cluster, where the second acknowledgment indicates that the UE received the beam update indication from the first TRP.

In some cases, the first acknowledgment confirms that a beam configuration was updated for communications with the second TRP. In some cases, the first acknowledgment is received at the first TRP and the first TRP communicates the acknowledgment with the second TRP. In some cases, the first acknowledgment is received at the first TRP, the second TRP or both.

The beam manager 1125 may receive the first acknowledgement at the first TRP using a first uplink beam based on resources indicated by the first control signal. In some examples, the beam manager 1125 may receive the second acknowledgement at the second TRP using a second uplink beam based on resources indicated by the first control signal, where the first and second uplink beams each include the same time and frequency resources. In some examples, the beam manager 1125 may receive the first acknowledgment at the first TRP using first uplink resources that are based on a resource indicator and an acknowledgment timing offset in the first control signal. In some examples, the beam manager 1125 may receive the second acknowledgment at the second TRP using second uplink resources that are based on modified parameters for the resource indicator and the acknowledgment timing offset in the first control signal.

In some examples, the beam manager 1125 may update a beam configuration at the first TRP based on the beam update indication. In some examples, the beam manager 1125 may receive the first acknowledgment at the first TRP using a first uplink beam. In some examples, the beam manager 1125 may receive a second acknowledgment at the second TRP using a second uplink beam, where the first and second uplink beams each include the same time and frequency resources based on the first control signal. In some examples, the beam manager 1125 may receive the first acknowledgment at the first TRP using first uplink resources that are based on a resource indicator and an acknowledgment timing offset in the first control signal. In some examples, the beam manager 1125 may receive a second acknowledgment at the second TRP using second uplink resources that are based on modified parameters for the resource indicator and the acknowledgment timing offset in the first control signal.

In some cases, the second uplink resources are based on configured resources for transmissions between the UE and the second TRP. In some cases, the second acknowledgment is received by the second TRP after the first acknowledgment is received by the first TRP. In some cases, the second acknowledgment is received by the second TRP using dedicated resources for communicating MAC-CE confirmations. In some cases, the acknowledgment timing offset for the second uplink resources are sent using a modified acknowledgment timing offset that is greater than a first acknowledgment timing offset for the first uplink resources.

In some cases, the first acknowledgment is received using dedicated resources for communicating MAC-CE confirmations.

Figure 12:
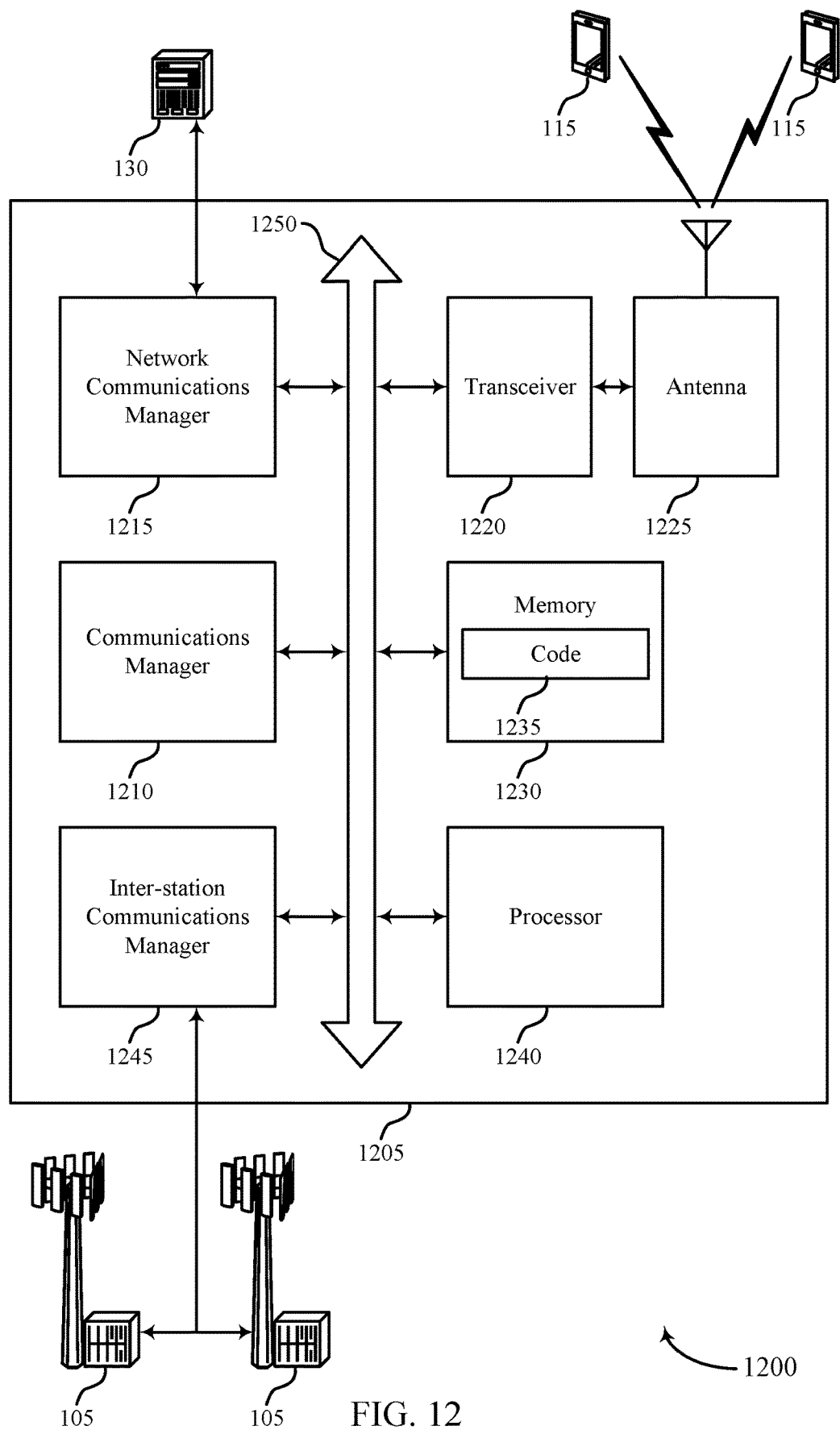
FIG. 12 shows a diagram of a system including a device that supports beam updating for multiple TRPs in accordance with aspects of the present disclosure.

FIG. 12 shows a diagram of a system 1200 including a device 1205 that supports beam updating for multiple TRPs in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a configuration message to a UE that configures the UE to receive control signals from a first TRP and a second TRP of the TRP cluster, transmit a first control signal from the first TRP of the TRP cluster indicating resources for receiving a MAC-CE, where the first control signal includes an indication that associates the MAC-CE with the first TRP, transmit the MAC-CE based on transmitting the first control signal, where the MAC-CE includes a beam update indication for the first TRP, and receive a first acknowledgment from the UE based on transmitting the MAC-CE. The communications manager 1210 may also transmit a configuration message to a UE that configures the UE to receive control signals from a first TRP and a second TRP of the TRP cluster, transmit a first control signal from the first TRP indicating resources for receiving a MAC-CE, transmit the MAC-CE from the first TRP, where the MAC-CE includes a first beam update indication for the second TRP and an indication that associates the MAC-CE with the second TRP, and receive a first acknowledgment at the TRP cluster based on transmitting the MAC-CE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting beam updating for multiple TRPs).

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
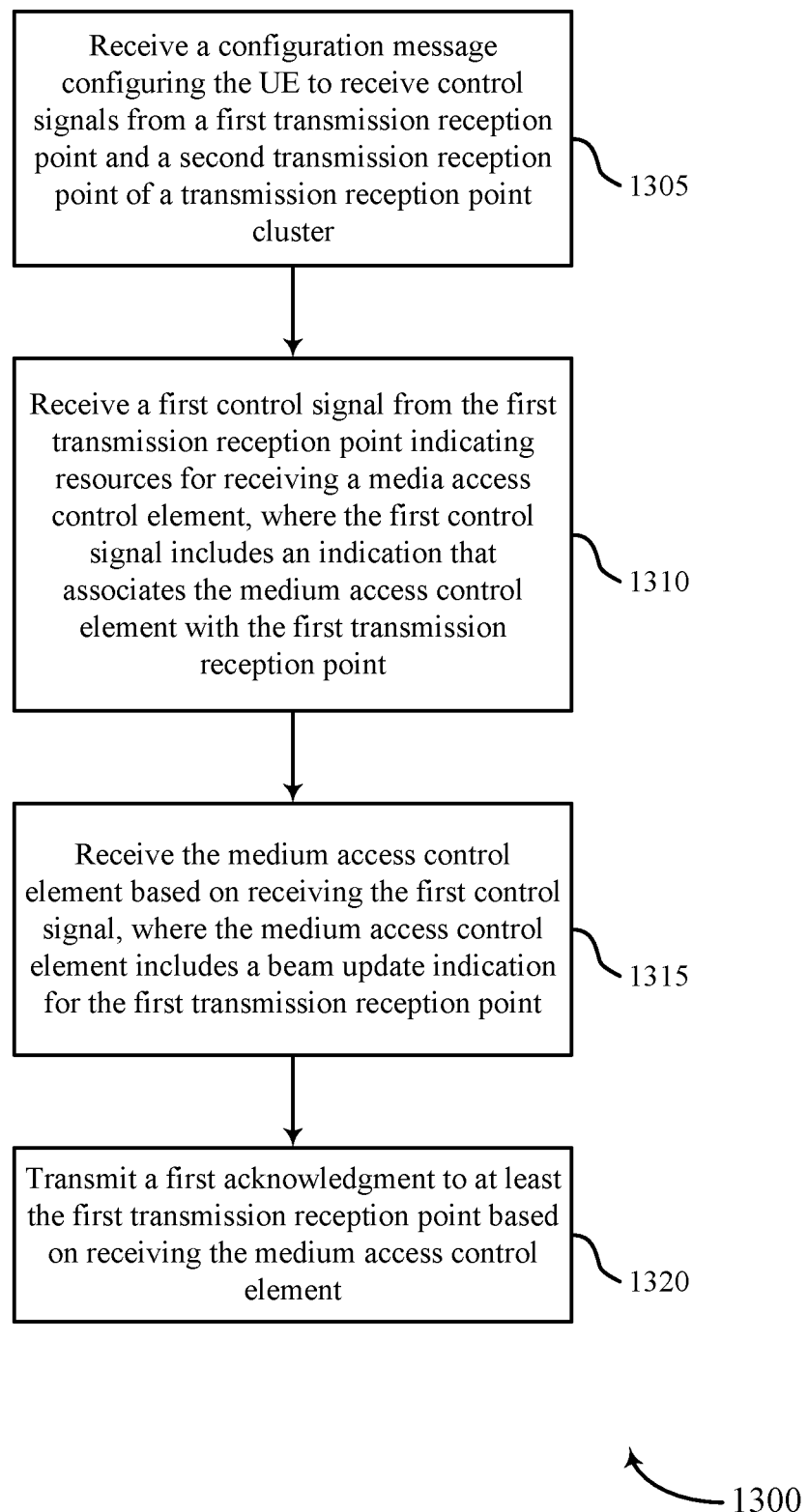
FIGS. 13 through 18 show flowcharts illustrating methods that support beam updating for multiple TRPs in accordance with aspects of the present disclosure.

FIG. 13 shows a flowchart illustrating a method 1300 that supports beam updating for multiple TRPs in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration message configuring the UE to receive control signals from a first TRP and a second TRP of a TRP cluster. The operations of 1305 may be performed according to the methods described herein. In some examples, aspects of the operations of 1305 may be performed by a control message manager as described with reference to FIGS. 5 through 8.

At 1310, the UE may receive a first control signal from the first TRP indicating resources for receiving a MAC-CE, where the first control signal includes an indication that associates the MAC-CE with the first TRP. The operations of 1310 may be performed according to the methods described herein. In some examples, aspects of the operations of 1310 may be performed by a control message manager as described with reference to FIGS. 5 through 8.

At 1315, the UE may receive the MAC-CE based on receiving the first control signal, where the MAC-CE includes a beam update indication for the first TRP. The operations of 1315 may be performed according to the methods described herein. In some examples, aspects of the operations of 1315 may be performed by a medium access manager as described with reference to FIGS. 5 through 8.

At 1320, the UE may transmit a first acknowledgment to at least the first TRP based on receiving the MAC-CE. The operations of 1320 may be performed according to the methods described herein. In some examples, aspects of the operations of 1320 may be performed by a feedback manager as described with reference to FIGS. 5 through 8.

Figure 14:
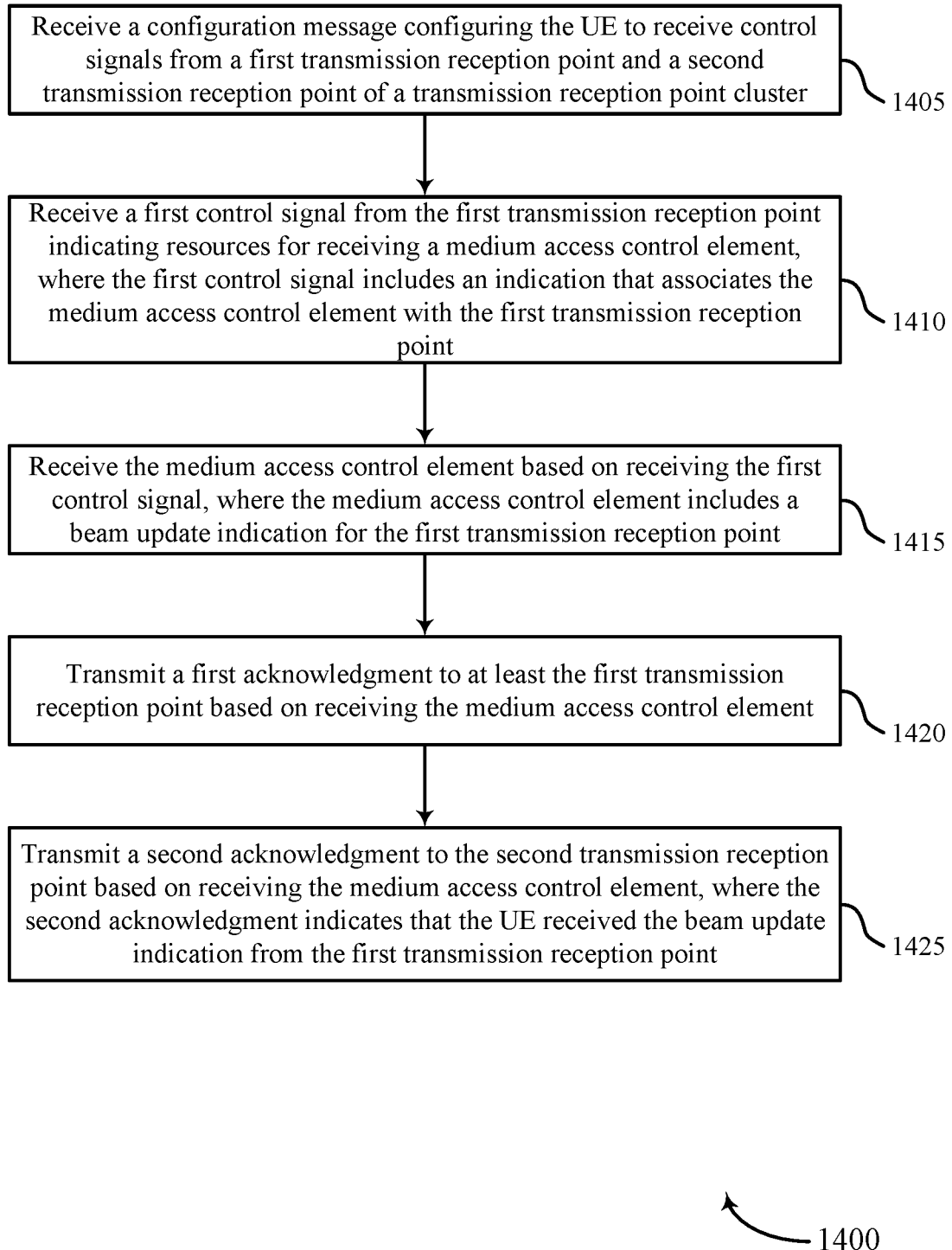

FIG. 14 shows a flowchart illustrating a method 1400 that supports beam updating for multiple TRPs in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration message configuring the UE to receive control signals from a first TRP and a second TRP of a TRP cluster. The operations of 1405 may be performed according to the methods described herein. In some examples, aspects of the operations of 1405 may be performed by a control message manager as described with reference to FIGS. 5 through 8.

At 1410, the UE may receive a first control signal from the first TRP indicating resources for receiving a MAC-CE, where the first control signal includes an indication that associates the MAC-CE with the first TRP. The operations of 1410 may be performed according to the methods described herein. In some examples, aspects of the operations of 1410 may be performed by a control message manager as described with reference to FIGS. 5 through 8.

At 1415, the UE may receive the MAC-CE based on receiving the first control signal, where the MAC-CE includes a beam update indication for the first TRP. The operations of 1415 may be performed according to the methods described herein. In some examples, aspects of the operations of 1415 may be performed by a medium access manager as described with reference to FIGS. 5 through 8.

At 1420, the UE may transmit a first acknowledgment to at least the first TRP based on receiving the MAC-CE. The operations of 1420 may be performed according to the methods described herein. In some examples, aspects of the operations of 1420 may be performed by a feedback manager as described with reference to FIGS. 5 through 8.

At 1425, the UE may transmit a second acknowledgment to the second TRP based on receiving the MAC-CE, where the second acknowledgment indicates that the UE received the beam update indication from the first TRP. The operations of 1425 may be performed according to the methods described herein. In some examples, aspects of the operations of 1425 may be performed by a feedback manager as described with reference to FIGS. 5 through 8.

Figure 15:
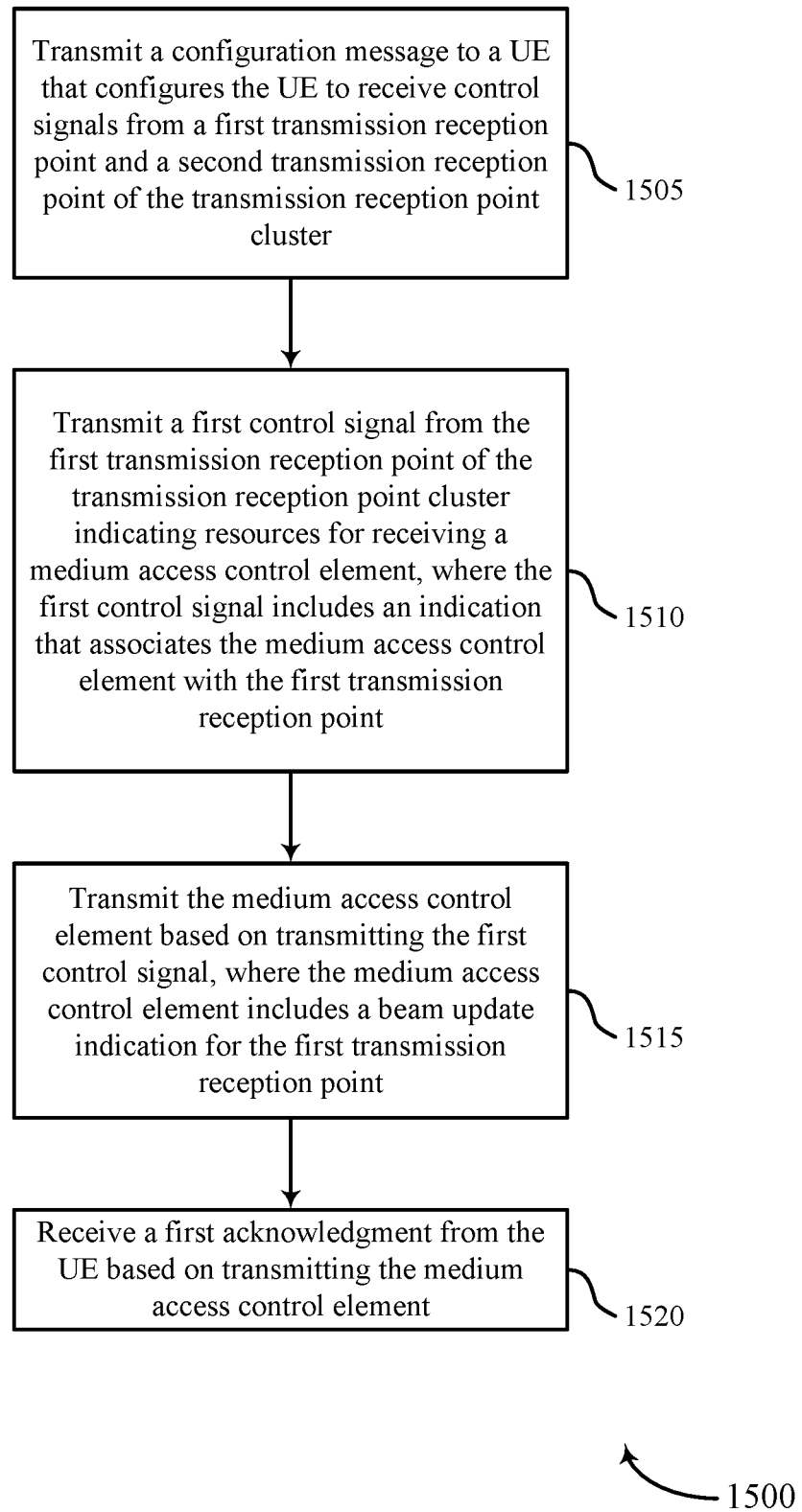

FIG. 15 shows a flowchart illustrating a method 1500 that supports beam updating for multiple TRPs in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit a configuration message to a UE that configures the UE to receive control signals from a first TRP and a second TRP of the TRP cluster. The operations of 1505 may be performed according to the methods described herein. In some examples, aspects of the operations of 1505 may be performed by a control message manager as described with reference to FIGS. 9 through 12.

At 1510, the base station may transmit a first control signal from the first TRP of the TRP cluster indicating resources for receiving a MAC-CE, where the first control signal includes an indication that associates the MAC-CE with the first TRP. The operations of 1510 may be performed according to the methods described herein. In some examples, aspects of the operations of 1510 may be performed by a control message manager as described with reference to FIGS. 9 through 12.

At 1515, the base station may transmit the MAC-CE based on transmitting the first control signal, where the MAC-CE includes a beam update indication for the first TRP. The operations of 1515 may be performed according to the methods described herein. In some examples, aspects of the operations of 1515 may be performed by a medium access manager as described with reference to FIGS. 9 through 12.

At 1520, the base station may receive a first acknowledgment from the UE based on transmitting the MAC-CE. The operations of 1520 may be performed according to the methods described herein. In some examples, aspects of the operations of 1520 may be performed by a feedback manager as described with reference to FIGS. 9 through 12.

Figure 16:
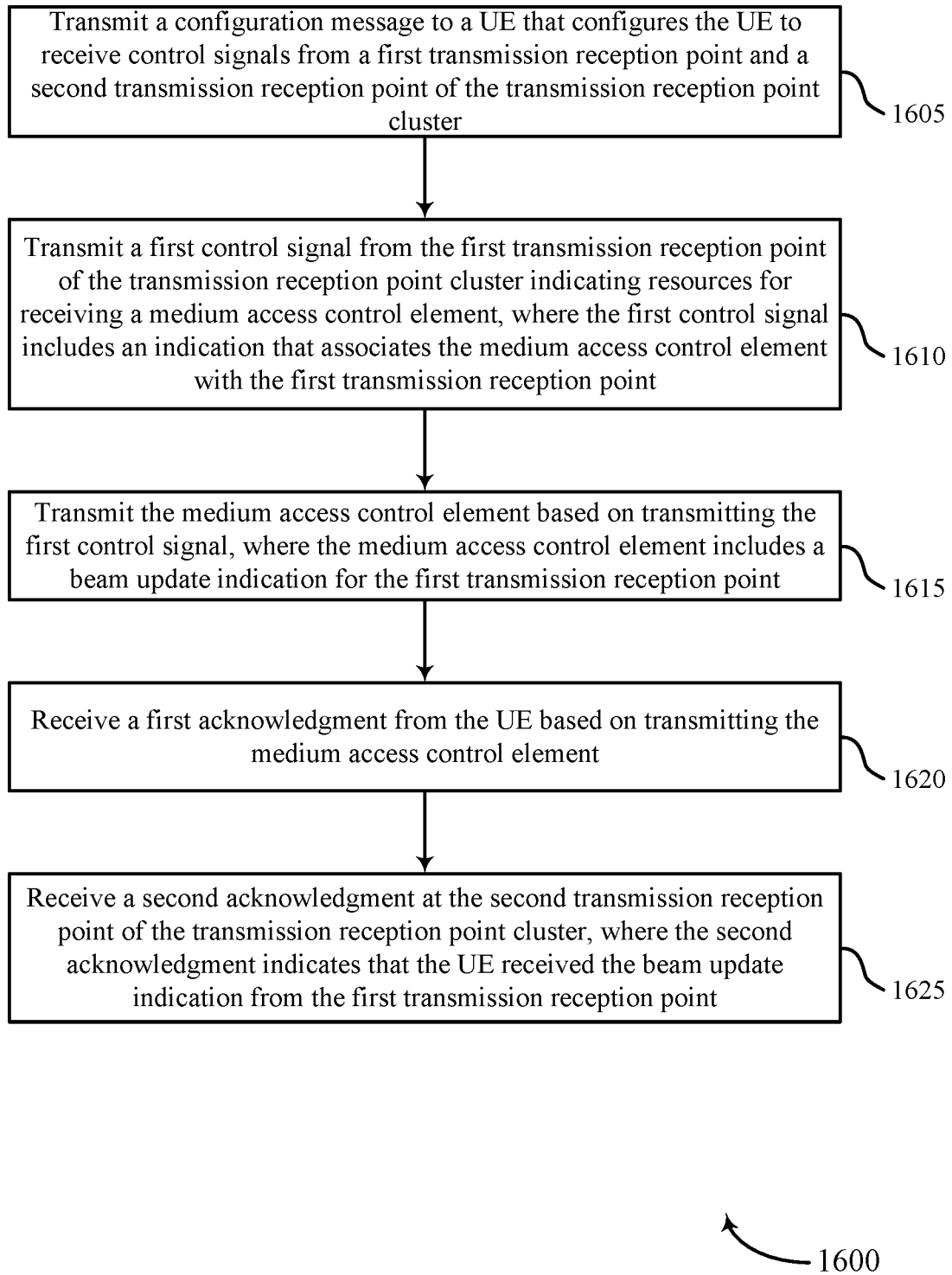

FIG. 16 shows a flowchart illustrating a method 1600 that supports beam updating for multiple TRPs in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a configuration message to a UE that configures the UE to receive control signals from a first TRP and a second TRP of the TRP cluster. The operations of 1605 may be performed according to the methods described herein. In some examples, aspects of the operations of 1605 may be performed by a control message manager as described with reference to FIGS. 9 through 12.

At 1610, the base station may transmit a first control signal from the first TRP of the TRP cluster indicating resources for receiving a MAC-CE, where the first control signal includes an indication that associates the MAC-CE with the first TRP. The operations of 1610 may be performed according to the methods described herein. In some examples, aspects of the operations of 1610 may be performed by a control message manager as described with reference to FIGS. 9 through 12.

At 1615, the base station may transmit the MAC-CE based on transmitting the first control signal, where the MAC-CE includes a beam update indication for the first TRP. The operations of 1615 may be performed according to the methods described herein. In some examples, aspects of the operations of 1615 may be performed by a medium access manager as described with reference to FIGS. 9 through 12.

At 1620, the base station may receive a first acknowledgment from the UE based on transmitting the MAC-CE. The operations of 1620 may be performed according to the methods described herein. In some examples, aspects of the operations of 1620 may be performed by a feedback manager as described with reference to FIGS. 9 through 12.

At 1625, the base station may receive a second acknowledgment at the second TRP of the TRP cluster, where the second acknowledgment indicates that the UE received the beam update indication from the first TRP. The operations of 1625 may be performed according to the methods described herein. In some examples, aspects of the operations of 1625 may be performed by a feedback manager as described with reference to FIGS. 9 through 12.

Figure 17:
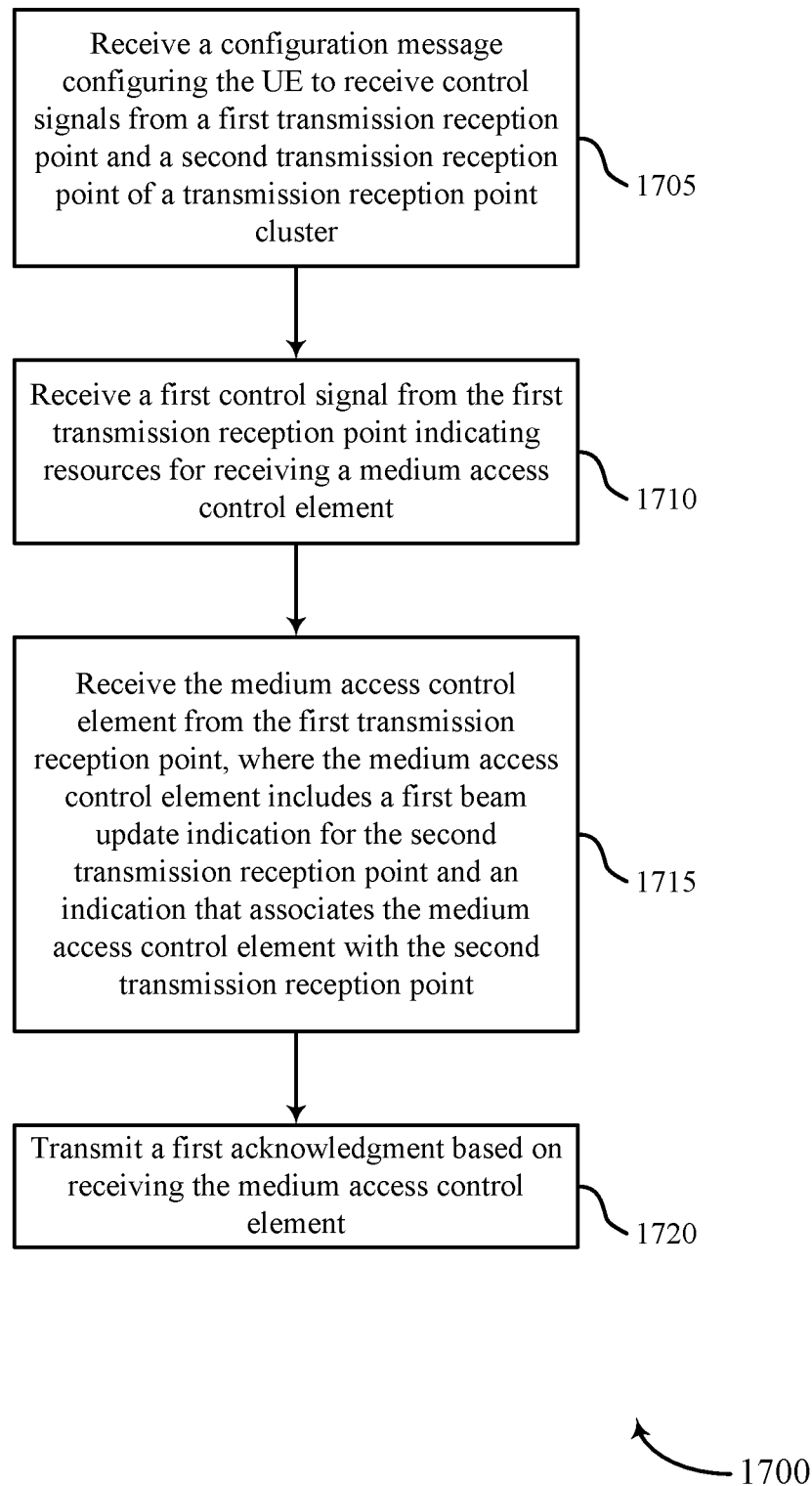

FIG. 17 shows a flowchart illustrating a method 1700 that supports beam updating for multiple TRPs in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive a configuration message configuring the UE to receive control signals from a first TRP and a second TRP of a TRP cluster. The operations of 1705 may be performed according to the methods described herein. In some examples, aspects of the operations of 1705 may be performed by a control message manager as described with reference to FIGS. 5 through 8.

At 1710, the UE may receive a first control signal from the first TRP indicating resources for receiving a MAC-CE. The operations of 1710 may be performed according to the methods described herein. In some examples, aspects of the operations of 1710 may be performed by a control message manager as described with reference to FIGS. 5 through 8.

At 1715, the UE may receive the MAC-CE from the first TRP, where the MAC-CE includes a first beam update indication for the second TRP and an indication that associates the MAC-CE with the second TRP. The operations of 1715 may be performed according to the methods described herein. In some examples, aspects of the operations of 1715 may be performed by a medium access manager as described with reference to FIGS. 5 through 8.

At 1720, the UE may transmit a first acknowledgment based on receiving the MAC-CE. The operations of 1720 may be performed according to the methods described herein. In some examples, aspects of the operations of 1720 may be performed by a feedback manager as described with reference to FIGS. 5 through 8.

Figure 18:
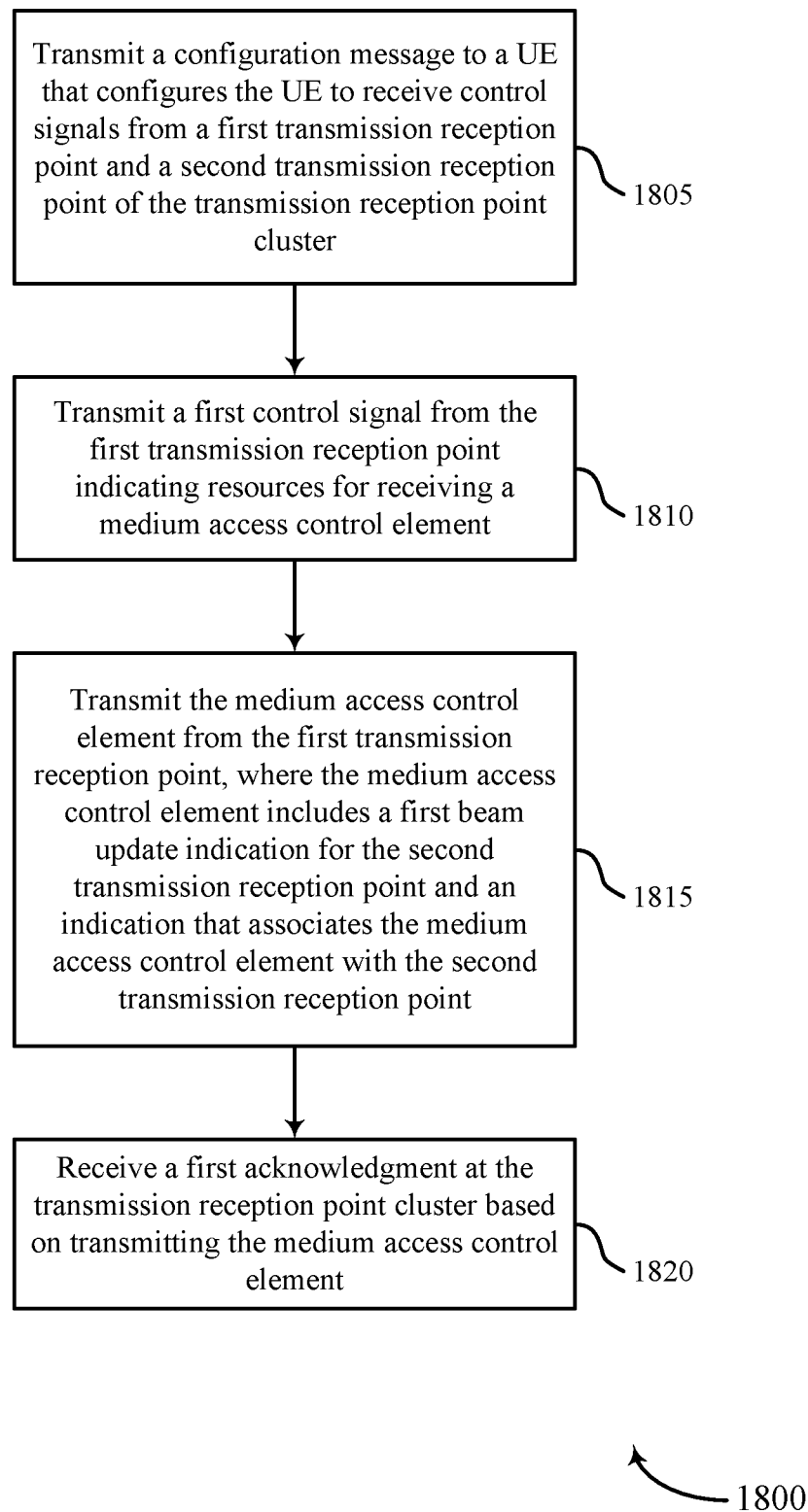

FIG. 18 shows a flowchart illustrating a method 1800 that supports beam updating for multiple TRPs in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below.

Additionally or alternatively, a base station may perform aspects of the functions described below using special-purpose hardware.

At 1805, the base station may transmit a configuration message to a UE that configures the UE to receive control signals from a first TRP and a second TRP of the TRP cluster. The operations of 1805 may be performed according to the methods described herein. In some examples, aspects of the operations of 1805 may be performed by a control message manager as described with reference to FIGS. 9 through 12.

At 1810, the base station may transmit a first control signal from the first TRP indicating resources for receiving a MAC-CE. The operations of 1810 may be performed according to the methods described herein. In some examples, aspects of the operations of 1810 may be performed by a control message manager as described with reference to FIGS. 9 through 12.

At 1815, the base station may transmit the MAC-CE from the first TRP, where the MAC-CE includes a first beam update indication for the second TRP and an indication that associates the MAC-CE with the second TRP. The operations of 1815 may be performed according to the methods described herein. In some examples, aspects of the operations of 1815 may be performed by a medium access manager as described with reference to FIGS. 9 through 12.

At 1820, the base station may receive a first acknowledgment at the TRP cluster based on transmitting the MAC-CE. The operations of 1820 may be performed according to the methods described herein. In some examples, aspects of the operations of 1820 may be performed by a feedback manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
 receiving a configuration message configuring the UE to receive control signals from a first transmission reception point and a second transmission reception point of a transmission reception point cluster;
 receiving a first control signal from the first transmission reception point indicating resources for receiving a medium access control element, wherein the first control signal comprises an indication that associates the medium access control element with the first transmission reception point;
 receiving the medium access control element based at least in part on receiving the first control signal, wherein the medium access control element comprises a beam update indication for the first transmission reception point; and
 transmitting a first acknowledgment to at least the first transmission reception point based at least in part on receiving the medium access control element.

2. The method of claim 1, further comprising:
 transmitting the first acknowledgment to the first transmission reception point using a first uplink beam comprising time and frequency resources based at least in part on the first control signal.

3. The method of claim 2, further comprising:
 transmitting the first acknowledgment to the first transmission reception point using first uplink resources that are based at least in part on a resource indicator and an acknowledgment timing offset in the first control signal.

4. The method of claim 1, further comprising:
 updating a beam configuration at the UE based at least in part on the beam update indication.

5. The method of claim 1, wherein the beam update indication comprises a transmission control indicator state.

6. A method for wireless communication at a transmission reception point cluster, comprising:
 transmitting a configuration message to a user equipment (UE) that configures the UE to receive control signals from a first transmission reception point and a second transmission reception point of the transmission reception point cluster;
 transmitting a first control signal from the first transmission reception point of the transmission reception point cluster indicating resources for receiving a medium access control element, wherein the first control signal comprises an indication that associates the medium access control element with the first transmission reception point;
 transmitting the medium access control element based at least in part on transmitting the first control signal, wherein the medium access control element comprises a beam update indication for the first transmission reception point; and
 receiving a first acknowledgment from the UE based at least in part on transmitting the medium access control element.

7. The method of claim 6, further comprising:
 receiving the first acknowledgement at the first transmission reception point using a first uplink beam based at least in part on resources indicated by the first control signal.

8. The method of claim 6, further comprising:
 receiving the first acknowledgment at the first transmission reception point using first uplink resources that are based at least in part on a resource indicator and an acknowledgment timing offset in the first control signal.

9. The method of claim 6, further comprising:
 updating a beam configuration at the first transmission reception point based at least in part on the beam update indication.

10. The method of claim 6, wherein the beam update indication comprises a transmission control indicator state.

11. A method for wireless communication at a user equipment (UE), comprising:
 receiving a configuration message configuring the UE to receive control signals from a first transmission reception point and a second transmission reception point of a transmission reception point cluster;
 receiving a first control signal from the first transmission reception point indicating resources for receiving a medium access control element;
 receiving the medium access control element from the first transmission reception point, wherein the medium access control element comprises a first beam update indication for the second transmission reception point and an indication that associates the medium access control element with the second transmission reception point; and
 transmitting a first acknowledgment based at least in part on receiving the medium access control element.

12. The method of claim 11, wherein the medium access control element comprises a first transmission reception point indicator for indicating that the first beam update indication is associated with the second transmission reception point.

13. The method of claim 12, wherein the medium access control element comprises:
 a second beam update indicator for the first transmission reception point; and
 a second transmission reception point indicator for indicating that the second beam update indicator is associated with the first transmission reception point.

14. The method of claim 11, wherein the medium access control element is configured to include:

a first set of fields comprising a beam update indication for the second transmission reception point;
a second set of fields comprising a beam update indication for the first transmission reception point; and
a transmission reception point indicator filed for indicating whether the beam update indication for the second transmission reception point is included in the medium access control element.

15. The method of claim 11, wherein the first acknowledgment confirms that a beam configuration was updated for communications with the second transmission reception point.

16. The method of claim 15, wherein the first acknowledgment is transmitted by the UE to the first transmission reception point to be communicated with the second transmission reception point.

17. The method of claim 15, wherein the first acknowledgment is transmitted to the first transmission reception point, the second transmission reception point or both.

18. The method of claim 11, further comprising:
transmitting the first acknowledgment to the first transmission reception point using a first uplink beam; and
transmitting a second acknowledgment to the second transmission reception point using a second uplink beam, wherein the first and second uplink beams each comprise the same time and frequency resources based at least in part on the first control signal.

19. The method of claim 11, further comprising:
transmitting the first acknowledgment to the first transmission reception point using first uplink resources that are based at least in part on a resource indicator and an acknowledgment timing offset in the first control signal; and
transmitting a second acknowledgment to the second transmission reception point using second uplink resources that are based at least in part on modified parameters for the resource indicator and the acknowledgment timing offset in the first control signal.

20. The method of claim 19, wherein the acknowledgment timing offset for the second uplink resources is sent using a modified acknowledgment timing offset that is greater than a first acknowledgment timing offset for the first uplink resources.

21. A method for wireless communication at a transmission reception point cluster, comprising:
transmitting a configuration message to a user equipment (UE) that configures the UE to receive control signals from a first transmission reception point and a second transmission reception point of the transmission reception point cluster;
transmitting a first control signal from the first transmission reception point indicating resources for receiving a medium access control element;
transmitting the medium access control element from the first transmission reception point, wherein the medium access control element comprises a first beam update indication for the second transmission reception point and an indication that associates the medium access control element with the second transmission reception point; and
receiving a first acknowledgment at the transmission reception point cluster based at least in part on transmitting the medium access control element.

22. The method of claim 21, wherein the medium access control element comprises a first transmission reception point indicator for indicating that the first beam update indication is associated with the second transmission reception point.

23. The method of claim 22, wherein the medium access control element comprises:
a second beam update indicator for the first transmission reception point; and
a second transmission reception point indicator for indicating that the second beam update indicator is associated with the first transmission reception point.

24. The method of claim 21, wherein the medium access control element is configured to include:
a first set of fields comprising a beam update indication for the second transmission reception point;
a second set of fields comprising a beam update indication for the first transmission reception point; and
a transmission reception point indicator filed for indicating whether the beam update indication for the second transmission reception point is includes in the medium access control element.

25. The method of claim 21, wherein the first acknowledgment confirms that a beam configuration was updated for communications with the second transmission reception point.

26. The method of claim 21, wherein the first acknowledgment is received at the first transmission reception point and the first transmission reception point communicates the acknowledgment with the second transmission reception point.

27. The method of claim 21, wherein the first acknowledgment is received at the first transmission reception point, the second transmission reception point or both.

28. The method of claim 21, further comprising:
receiving the first acknowledgment at the first transmission reception point using a first uplink beam; and
receiving a second acknowledgment at the second transmission reception point using a second uplink beam, wherein the first and second uplink beams each comprise the same time and frequency resources based at least in part on the first control signal.

29. The method of claim 21, further comprising:
receiving the first acknowledgment at the first transmission reception point using first uplink resources that are based at least in part on a resource indicator and an acknowledgment timing offset in the first control signal; and
receiving a second acknowledgment at the second transmission reception point using second uplink resources that are based at least in part on modified parameters for the resource indicator and the acknowledgment timing offset in the first control signal.

30. The method of claim 29, wherein the acknowledgment timing offset for the second uplink resources are sent using a modified acknowledgment timing offset that is greater than a first acknowledgment timing offset for the first uplink resources.

* * * * *